(12) United States Patent
Anno

(10) Patent No.: US 9,223,276 B2
(45) Date of Patent: Dec. 29, 2015

(54) PRINTING APPARATUS, PRINTING APPARATUS CONTROL METHOD, AND STORAGE MEDIUM FOR GENERATING NEW PAPER INFORMATION

(71) Applicant: CANON KABUSHIKI KAISHA, Tokyo (JP)

(72) Inventor: Makoto Anno, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/097,554

(22) Filed: Dec. 5, 2013

(65) Prior Publication Data

US 2014/0160524 A1 Jun. 12, 2014

(30) Foreign Application Priority Data

Dec. 7, 2012 (JP) ................................ 2012-268380

(51) Int. Cl.
*G03G 15/00* (2006.01)
*H04N 1/00* (2006.01)

(52) U.S. Cl.
CPC ........... *G03G 15/502* (2013.01); *H04N 1/0035* (2013.01)

(58) Field of Classification Search
None
See application file for complete search history.

(56) References Cited

U.S. PATENT DOCUMENTS

2002/0126197 A1* 9/2002 Minowa et al. ............... 347/193
2006/0262337 A1* 11/2006 Kamata et al. ............... 358/1.13
2012/0327444 A1* 12/2012 Kawanago et al. .......... 358/1.13

FOREIGN PATENT DOCUMENTS

JP 2002-029120 A 1/2002

* cited by examiner

*Primary Examiner* — Jeremiah Bryar
(74) *Attorney, Agent, or Firm* — Canon U.S.A., Inc., IP Division

(57) ABSTRACT

There is provided a printing apparatus in which when paper information is set for a paper holding unit, it can be determined whether to set paper information already stored in a paper brand database or generate new paper information and set the newly generated paper information for the paper holding unit.

10 Claims, 23 Drawing Sheets

FIG. 7

◇ STATUS CONFIRMATION/STOP

<PAPER TYPE SETTING MANAGEMENT>

DISPLAY: ☐ BASIC PAPER ☑ USER SETTING PAPER

| NAME | SIZE | GRAMMAGE (g/m2) |
|---|---|---|
| ☐ PLAIN PAPER | A4 | 77 |
| ☐ THICK PAPER | A4 | 120 |
| ☐ TAB PAPER | LETTER | 75 |
| ☑ USER-DEFINED PAPER 1 | A4 | 77 |

[DETAILS/EDITING] [NEW/COPY] [DELETION]

[CANCEL] [OK]

851
852
853
854

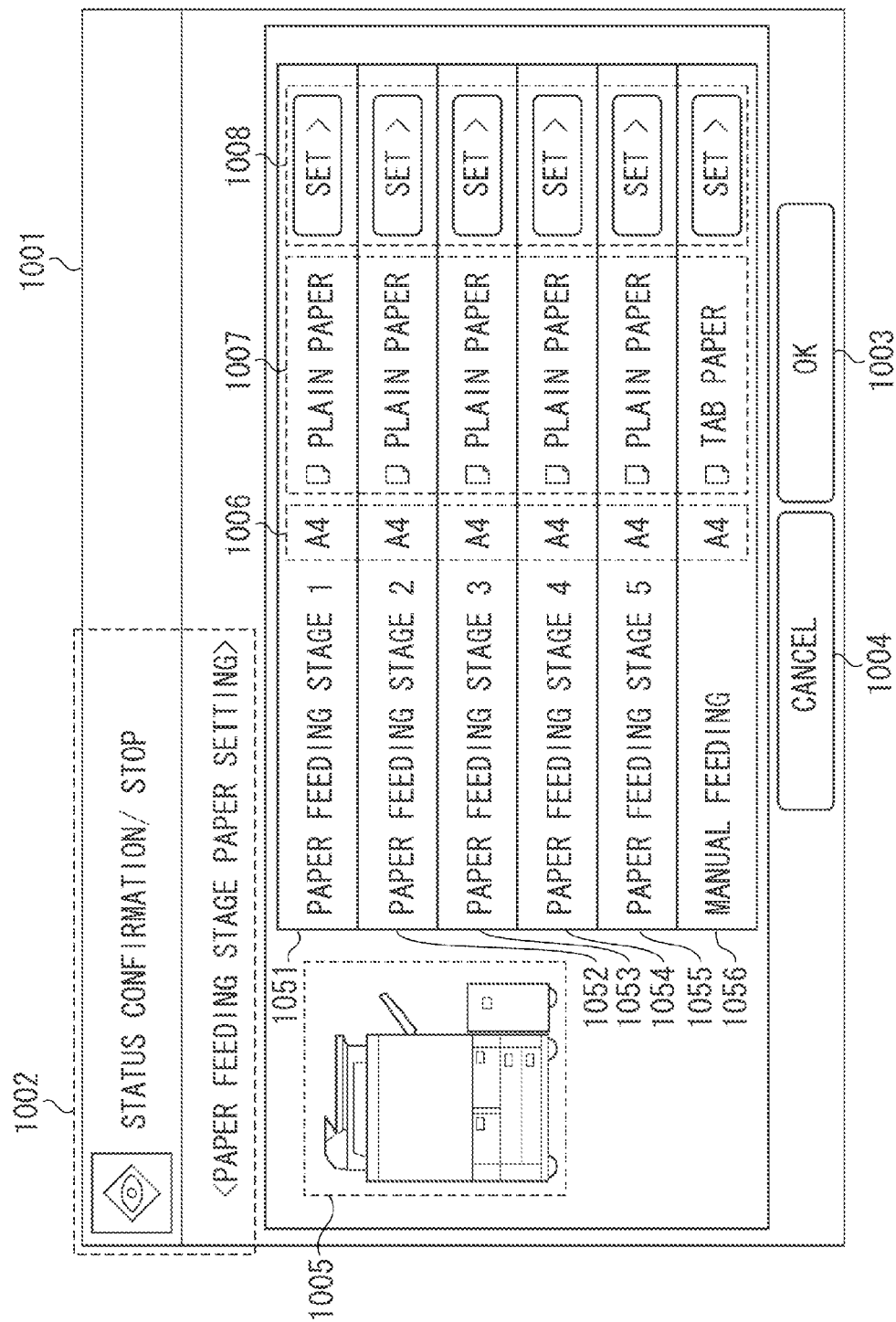

FIG. 9A

STATUS CONFIRMATION/STOP

<PAPER SETTING: PAPER TYPE>

DISPLAY: ☑ BASIC PAPER ☑ USER SETTING PAPER

| NAME | SIZE | GRAMMAGE (g/m2) |
|---|---|---|
| ☐ PLAIN PAPER | A4 | 77 |
| ☐ THICK PAPER | A4 | 120 |
| ☐ TAB PAPER | LETTER | 75 |

DETAILED INFORMATION

CANCEL   OK

FIG. 13

| 400 | 402 | 403 | 404 | 405 | 406 | 407 | 408 |
|---|---|---|---|---|---|---|---|
| | ID | NAME | SIZE | WEIGHT | COLOR | TYPE | CATEGORY |
| 421 | 0001 | PLAIN PAPER | A4 | 77 | WHITE | PLAIN | 1 |
| 422 | 0002 | THICK PAPER | A4 | 120 | WHITE | PLAIN | 1 |
| 423 | 0003 | TAB PAPER | LETTER | 75 | WHITE | TAB TYPE | 1 |
| 424 | 0004 | USER-DEFINED PAPER 1 | A4 | 77 | WHITE | PLAIN | 2 |
| 425 | 0005 | PROVISIONAL PAPER 1 | A4 | 77 | WHITE | PLAIN | 3 |
| 426 | 0006 | | | | | | |

FIG. 14

| | 501 | 502 | 503 | 504 | 505 | 506 | 507 | 508 |
|---|---|---|---|---|---|---|---|---|
| 500 | | ID | NAME | SIZE | WEIGHT | COLOR | TYPE | CATEGORY |
| 521 | PAPER FEEDING STAGE 1 | 0004 | USER-DEFINED PAPER 1 | A4 | 77 | WHITE | PLAIN | 2 |
| 522 | PAPER FEEDING STAGE 2 | 0001 | PLAIN PAPER | A4 | 77 | WHITE | PLAIN | 1 |
| 523 | PAPER FEEDING STAGE 3 | 0001 | PLAIN PAPER | A4 | 77 | WHITE | PLAIN | 1 |
| 524 | PAPER FEEDING STAGE 4 | 0001 | PLAIN PAPER | A4 | 77 | WHITE | PLAIN | 1 |
| 525 | PAPER FEEDING STAGE 5 | 0001 | PLAIN PAPER | A4 | 77 | WHITE | PLAIN | 1 |
| 526 | MANUAL FEEDING | 0003 | TAB PAPER | LETTER | 75 | WHITE | TAB TYPE | 1 |

FIG. 16

| PAPER FEEDING STAGE | ID | NAME | SIZE | WEIGHT | COLOR | TYPE | CATEGORY |
|---|---|---|---|---|---|---|---|
| PAPER FEEDING STAGE 1 | 0005 | PROVISIONAL PAPER 1 | A4 | 77 | WHITE | PLAIN | 3 |
| PAPER FEEDING STAGE 2 | 0001 | PLAIN PAPER | A4 | 77 | WHITE | PLAIN | 1 |
| PAPER FEEDING STAGE 3 | 0001 | PLAIN PAPER | A4 | 77 | WHITE | PLAIN | 1 |
| PAPER FEEDING STAGE 4 | 0001 | PLAIN PAPER | A4 | 77 | WHITE | PLAIN | 1 |
| PAPER FEEDING STAGE 5 | 0001 | PLAIN PAPER | A4 | 77 | WHITE | PLAIN | 1 |
| MANUAL FEEDING | 0003 | TAB PAPER | LETTER | 75 | WHITE | TAB TYPE | 1 |

| | 452 | 453 | 454 | 455 | 456 | 457 | 458 | 459 |
|---|---|---|---|---|---|---|---|---|
| 450 | ID | NAME | SIZE | WEIGHT | COLOR | TYPE | CATEGORY | OWNER |
| 471 | 0001 | PLAIN PAPER | A4 | 77 | WHITE | PLAIN | 1 | 0 |
| 472 | 0002 | THICK PAPER | A4 | 120 | WHITE | PLAIN | 1 | 0 |
| 473 | 0003 | TAB PAPER | LETTER | 75 | WHITE | TAB TYPE | 1 | 0 |
| 474 | 0004 | USER-DEFINED PAPER 1 | A4 | 77 | WHITE | PLAIN | 2 | AAAAA |
| 475 | 0005 | PROVISIONAL PAPER 1 | A4 | 77 | WHITE | PLAIN | 3 | BBBBB |
| 476 | 0006 | | | | | | | |

FIG. 22

| | 551 | 552 | 553 | 554 | 555 | 556 | 557 | 558 | 559 |
|---|---|---|---|---|---|---|---|---|---|
| 550 | | ID | NAME | SIZE | WEIGHT | COLOR | TYPE | CATEGORY | OWNER |
| 571 | PAPER FEEDING STAGE 1 | 0005 | PROVISIONAL PAPER 1 | A4 | 77 | WHITE | PLAIN | 3 | BBBBB |
| 572 | PAPER FEEDING STAGE 2 | 0001 | PLAIN PAPER | A4 | 77 | WHITE | PLAIN | 1 | 0 |
| 573 | PAPER FEEDING STAGE 3 | 0001 | PLAIN PAPER | A4 | 77 | WHITE | PLAIN | 1 | 0 |
| 574 | PAPER FEEDING STAGE 4 | 0001 | PLAIN PAPER | A4 | 77 | WHITE | PLAIN | 1 | 0 |
| 575 | PAPER FEEDING STAGE 5 | 0001 | PLAIN PAPER | A4 | 77 | WHITE | PLAIN | 1 | 0 |
| 576 | MANUAL FEEDING | 0003 | TAB PAPER | LETTER | 75 | WHITE | TAB TYPE | 1 | 0 |

PRINTING APPARATUS, PRINTING APPARATUS CONTROL METHOD, AND STORAGE MEDIUM FOR GENERATING NEW PAPER INFORMATION

BACKGROUND

1. Field

Aspects of the present invention generally relate to a printing apparatus, a method for controlling the printing apparatus, and a storage medium.

2. Description of the Related Art

A recent image processing apparatus has a plurality of functions, including not only a copy function but also a printing function and a network function. One of other functions that can be newly added for the image processing apparatus is a function of enabling a user to customize a paper type.

The paper type is generally represented by plain paper, thick paper, and tab paper. The paper type indicates a type of each paper that requires a unique operation to be performed to realize the printing function of the image processing apparatus. For example, in a case where a paper to be processed is the thick paper, the image processing apparatus performs fixation at a temperature higher than that for the plain paper. In a case where the paper to be processed is the tab paper, reversing the paper is restricted when the image processing apparatus performs two-sided printing. Therefore, each user needs to set a paper type accurately according to the type of a paper that the user wants to use in printing. Thus, the image processing apparatus can perform printing while appropriately handling the paper that the user wants to use in printing.

In general, a user selects one of paper types that are defined beforehand by the manufacturer of each image processing apparatus. On the other hand, a new function of enabling a user to customize the paper type is also available. Hereinafter, the above-mentioned new function is referred to as "paper brand function." For example, when the paper type of a paper to be processed has a fixed name (e.g., plain paper, thick paper, or tab paper), the paper brand function enables each user to change the name of the paper type. For example, when a user wants to use a specific paper (i.e., a paper different from the general papers) in printing, the user intends to discriminate the selected paper from generally used papers as a high-priced paper having excellent quality in fibers constituting the paper or as having a special watermark (e.g., firm name). In this case, the user may want to give a unique paper name (e.g., "high-grade paper" or "watermarked paper"), which is discriminable from that of the general plain paper, to the selected paper and may want to designate the changed paper name in using the paper in printing. Further, the image processing apparatus identifies the "high-grade paper" or the "watermarked paper" as a paper different from the plain paper. Therefore, the "high-grade paper" or the "watermarked paper" is not used for a job designating the usage of the plain paper. Accordingly, changing the name of the paper type is effective to prevent any careless paper feeding.

Although the color of papers is generally white, other color papers may be used. For example, there is a method for printing products for women using red papers while printing products for men using blue papers in such a way as to effectively discriminate print contents from each other. In this case, a user defines two types of papers by changing the color attribute of a paper type from ordinary white to red or blue and registers "red paper" and "blue paper" as two types of paper type names. Then, the user designates the red paper in printing products for women and designates the blue paper in printing products for men so that printing can be performed using desired color papers. In this manner, the paper brand function enables each user to handle papers flexibly.

An image processing apparatus discussed in Japanese Patent Application Laid-Open No. 2002-029120 has a function of registering a paper type, if it is customized by a user using the above-mentioned paper brand function, in a database (hereinafter, referred to as "DB") and a function of setting an arbitrary paper type, if it is selected by the user from the DB, as a paper type of papers to be fed from a paper feeding stage.

However, according to the functions discussed in Japanese Patent Application Laid-Open No. 2002-029120, when a user generates new paper information and sets the newly generated paper information for a paper feeding stage, the user is required to register the newly generated paper information in the DB beforehand. Accordingly, a significant labor and time is required for the user to complete the setting of new paper information for the paper feeding stage.

SUMMARY

Aspects of the present invention are generally directed to a technique capable of simplifying an operation that is required to set new paper information for a paper feeding stage.

An aspect of the present invention provides a printing apparatus including a paper holding unit, a storage unit configured to store paper information including name information indicating a paper name and attribute information indicating paper attributes, a display unit configured to display a setting screen for setting the paper information for the paper holding unit, and a determination unit configured to determine whether an instruction input via the setting screen is a first instruction to set the paper information stored in the storage unit for the paper holding unit or a second instruction to set newly generated paper information for the paper holding unit. The printing apparatus further includes a setting unit configured to set paper information that is selected from a plurality of pieces of paper information stored in the storage unit for the paper holding unit if the determination unit determines that the first instruction has been input, and configured to generate new paper information including name information and attribute information and set the newly generated paper information for the paper holding unit if the determination unit determines that the second instruction has been input. The new paper information generated by the setting unit is stored in the storage unit.

Further features of the present disclosure will become apparent from the following description of exemplary embodiments with reference to the attached drawings.

BRIEF DESCRIPTION OF THE DRAWINGS

FIG. 7 illustrates a fourth example of the operation screen.

FIG. 8 illustrates a fifth example of the operation screen.

FIG. 9A illustrates a sixth example of the operation screen, and FIG. 9B illustrates a seventh example of the operation screen.

FIG. 13 illustrates a first example of a paper brand DB.

FIG. 14 illustrates a first example of a paper feeding stage setting DB.

FIG. 16 illustrates a second example of the paper feeding stage setting DB.

FIG. 17 illustrates a second example of the paper feeding stage paper setting screen.

FIG. 21 illustrates a second example of the paper brand DB.

FIG. 22 illustrates a third example of the paper feeding stage setting DB.

DESCRIPTION OF THE EMBODIMENTS

An exemplary embodiment is described in detail below with reference to attached drawings.

In the following exemplary embodiment, a person who has administrator authority is referred to as an "administrator" and a person who does not have any administrator authority is referred to as a "general user." Further, a person who uses an image processing apparatus is simply referred to as a "user" if it is unnecessary to discriminate between an administrator and a general user.

<FIG. 1>

Figure 1:
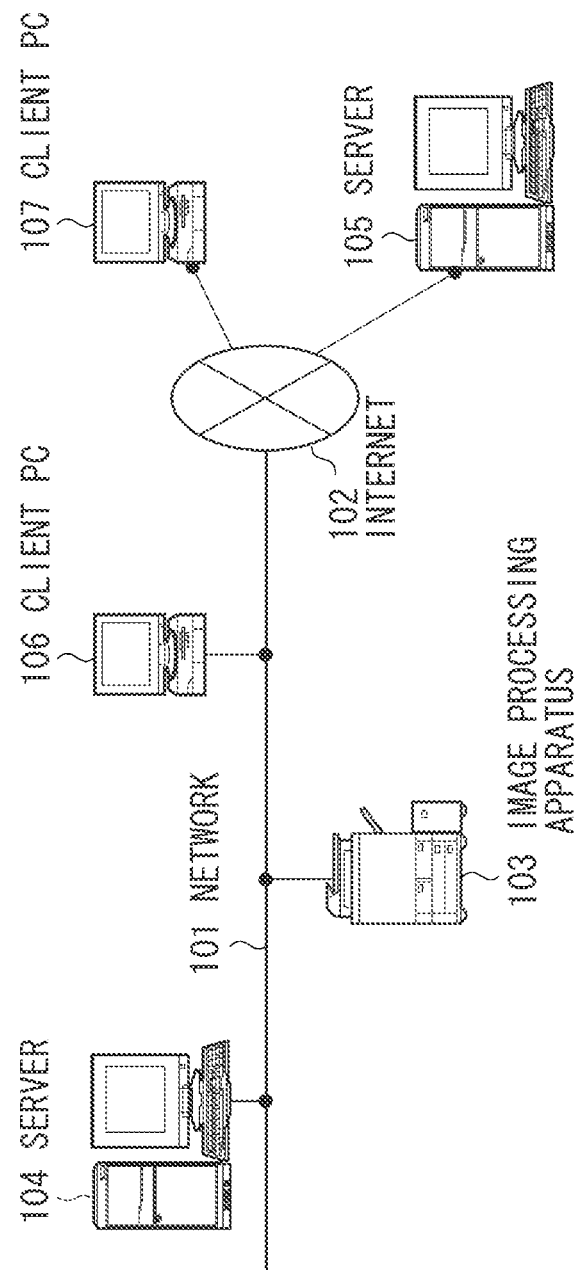
FIG. 1 illustrates an example of a system configuration of an image processing system.

FIG. 1 illustrates an example of a system configuration of an image processing system. An image processing apparatus (e.g., a printing apparatus) 103, a server 104, and a client PC 106 are connected to a network 101. Further, the network 101 is connected to another server 105 and another client PC 107 via an internet 102.

<FIG. 2>

Figure 2:
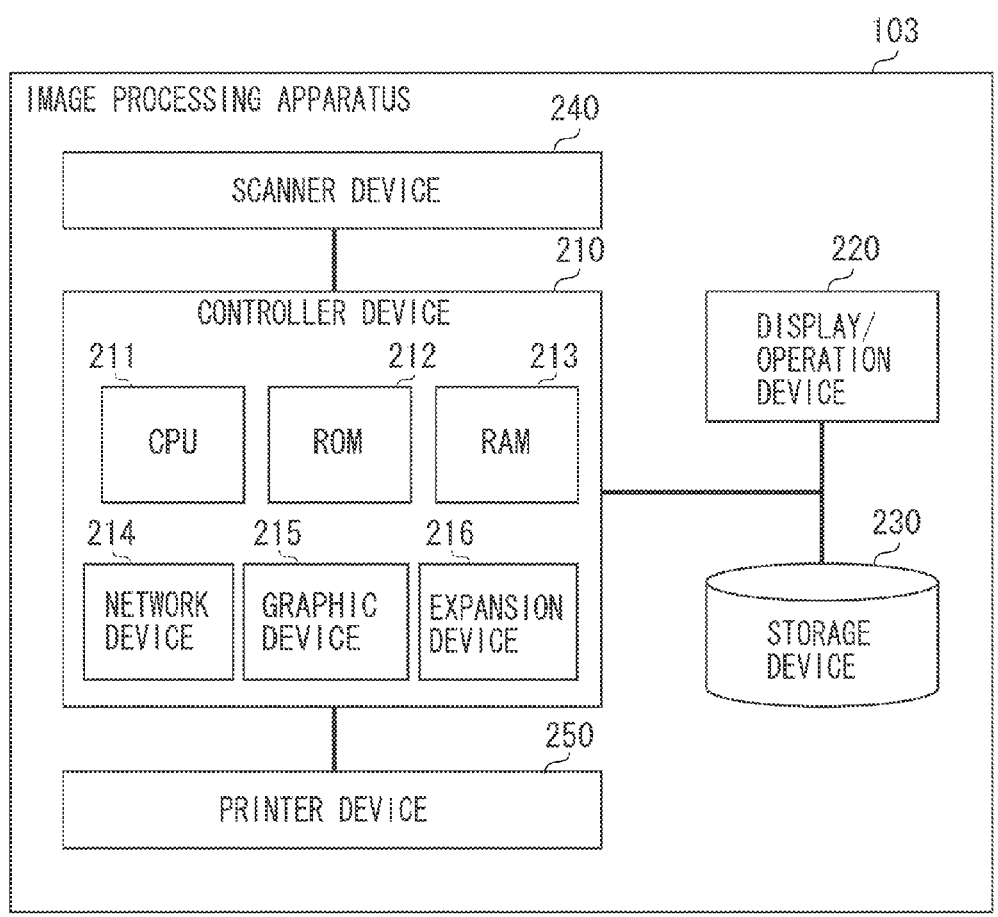
FIG. 2 illustrates an example of a hardware configuration of the image processing apparatus.

FIG. 2 illustrates an example of a hardware configuration of the image processing apparatus 103. The image processing apparatus 103 includes a controller device 210, a display/operation device 220, a storage device 230, a scanner device 240, and a printer device 250. The controller device 210 includes a central processing unit (CPU) 211, a read only memory (ROM) 212, a random access memory (RAM) 213, a network device 214, a graphic device 215, and an expansion device 216.

In the controller device 210, the CPU 211 executes a part or the whole of a program when the program is loaded from the ROM 212 to the RAM 213.

The network device 214 is a hardware device configured to connect the image processing apparatus 103 to the network 101. The network device 214 can communicate with each of the server 104, the server 105, the client PC 106, and the client PC 107 under control of the CPU 211 that executes processing based on the program.

The graphic device 215 performs processing on an image to be processed in the controller device 210 under control of the CPU 211 that executes processing based on the program.

The expansion device 216 is an interface configured to expand optional functions (e.g., Fax and wireless network). The expansion device 216 can be realized, for example, by a universal serial bus (USB) or a Peripheral Component Interconnect (PCI) bus. The expansion device 216 can expand optional functions under control of the CPU 211 that executes processing based on the program.

The display/operation device 220 is a hardware device represented by a touch panel type liquid crystal screen. The display/operation device 220 can display an operational state or an operation menu of the image processing apparatus 103 or can receive an operational instruction from a user, under control of the CPU 211 that executes processing based on the program.

The storage device 230 is a hardware device represented by a hard disk drive (HDD) or a flash memory. The storage device 230 can store files and data under control of the CPU 211 that executes processing based on the program.

The scanner device 240 can scan an original. For example, the scanner device 240 is configured to include a device that can automatically feed a plurality of originals. Further, the scanner device 240 is configured to include a signal cable that can transmit scanned data to the controller device 210 or a communication device that can transmit and receive various signals to and from the controller device 210. The scanner device 240 can include a CPU, a ROM, and a RAM to control the above-mentioned peripheral apparatuses. In the present exemplary embodiment, the above-mentioned devices are collectively referred to as the scanner device 240.

The printer device 250 can receive print data from the controller device 210. For example, the printer device 250 is configured to include a device that can perform printing based on a print instruction. In the present exemplary embodiment, the printer device 250 can be an inkjet type, an electrophotographic type, or any other type.

The controller device 210 can control the display/operation device 220, the storage device 230, the scanner device 240, and the printer device 250 under control of the CPU 211 that executes processing based on the program.

<FIG. 3>

Figure 3:
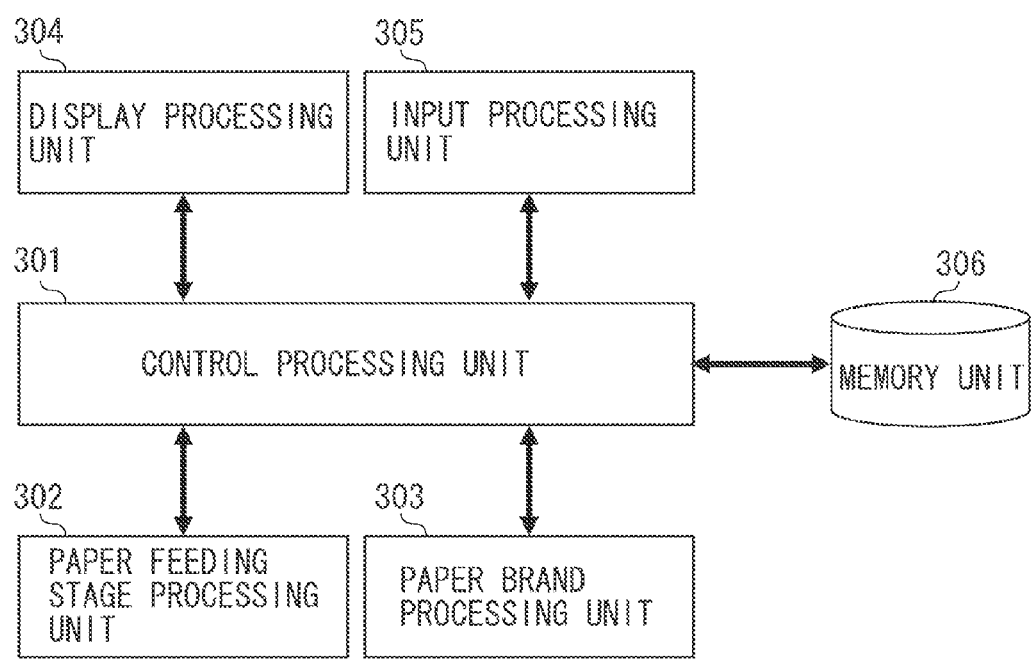
FIG. 3 illustrates an example of functional units, which are a part of processing units of the image processing apparatus, according to an exemplary embodiment.

FIG. 3 illustrates an example of various units that can realize functions relating to the present exemplary embodiment, which are a part of processing units of the image processing apparatus 103. As described with reference to FIG. 2, the CPU executes a part or the whole of the program when it is load from the ROM to the RAM in such a way as to realize functions of the processing units described below and processing of each flowchart described below.

A paper feeding stage processing unit 302 is functionally operable to process a paper type of papers stored in a paper feeding stage (i.e., a paper feeding cassette).

A paper brand processing unit 303 is functionally operable to perform a paper brand function.

A display processing unit 304 is functionally operable to display an operational state or an operation menu of the image processing apparatus 103 on the display/operation device 220.

An input processing unit 305 is functionally operable to receive an operational instruction from a user.

A memory unit 306 is functionally operable to store a database (DB) that can be used by the paper feeding stage processing unit 302 and the paper brand processing unit 303 to perform processing.

A control processing unit 301 is functionally operable to process various controls to be performed by the above-mentioned functional units 302 to 306.

The paper feeding stage processing unit 302, the paper brand processing unit 303, and their DB configurations are described in detail below.

First, management of the paper brand function and paper feeding stage paper setting are described in detail below.

<FIG. 4>

Figure 4:
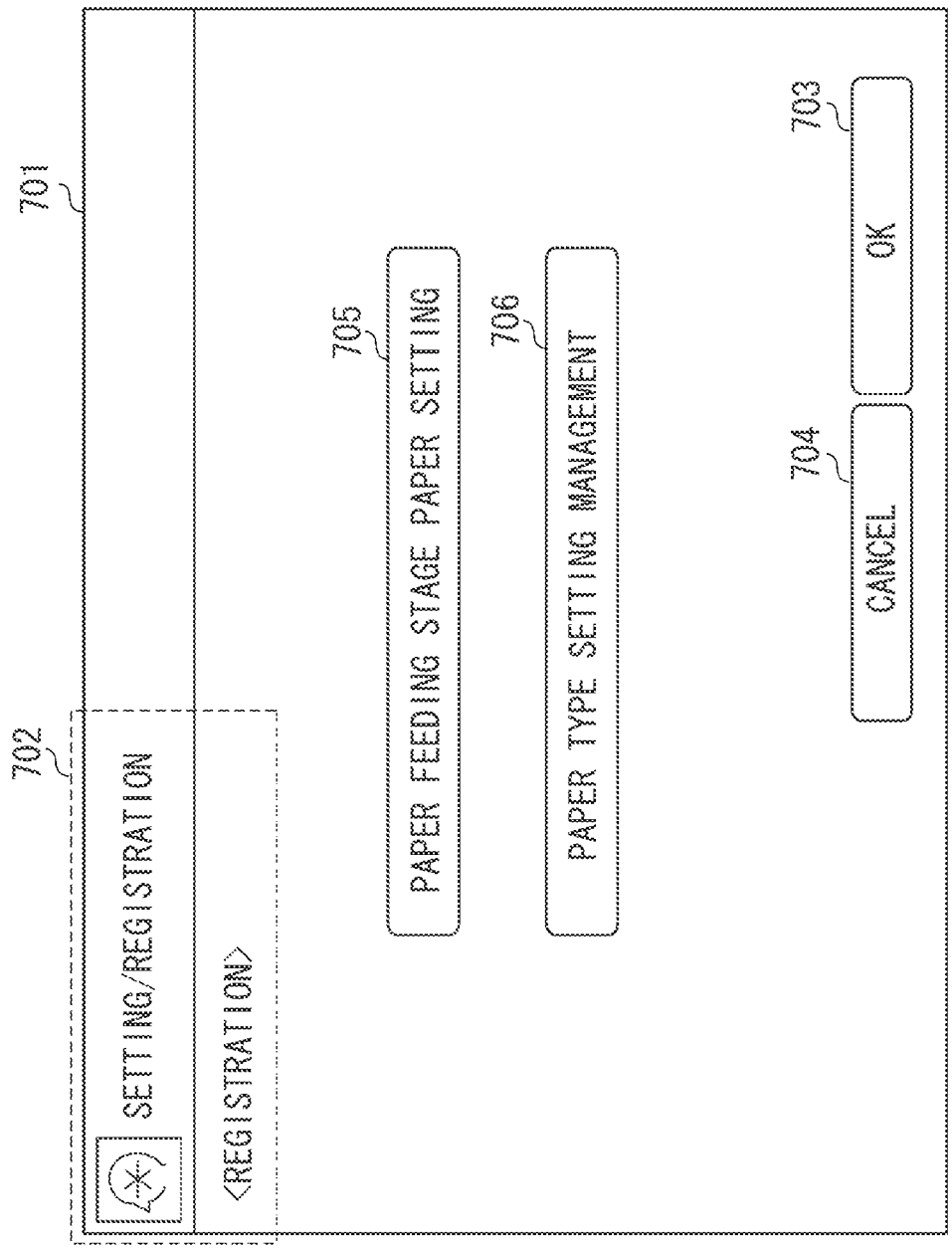
FIG. 4 illustrates a first example of an operation screen.

An administrator can operate the image processing apparatus 103 to call an operation screen 701 illustrated in FIG. 4. The operation screen 701 is displayable on the display/operation device 220. The operation screen 701 includes a display area 702, which can display a classification of the screen and explanation thereof. The operation screen 701 includes an OK button 703 and a cancel button 704. The administrator presses the OK button 703 when the administrator terminates the screen with intended contents and presses the cancel button 704 when the administrator cancels the instructed contents and terminates the screen. The operation screen 701 further includes a paper feeding stage paper setting button 705, which is operable to perform settings for papers stored in the paper feeding stage, and a paper type setting management button 706, which is operable to perform paper type setting management. The administrator presses the paper type setting management button 706 to manage settings relating to the paper type.

In this case, the input processing unit 305 detects an operation of the administrator and transmits a notification indicating the pressed position (i.e., a coordinate position) on a screen to the control processing unit 301. The control processing unit 301 analyzes the pressed button based on a bitmap of the screen displayed on the display/operation device 220 and the above-mentioned coordinate position, and performs processing according to the pressed button. Further, the control processing unit 301 generates a screen to be displayed next and transmits a notification including information about the generated screen contents to the display processing unit 304. The display processing unit 304 displays the notified screen on the display/operation device 220. In the manner described above, the image processing apparatus 103 performs the processing responding to the administrator's operation and shifts the screen to be displayed.

<FIG. 5>

Figure 5:
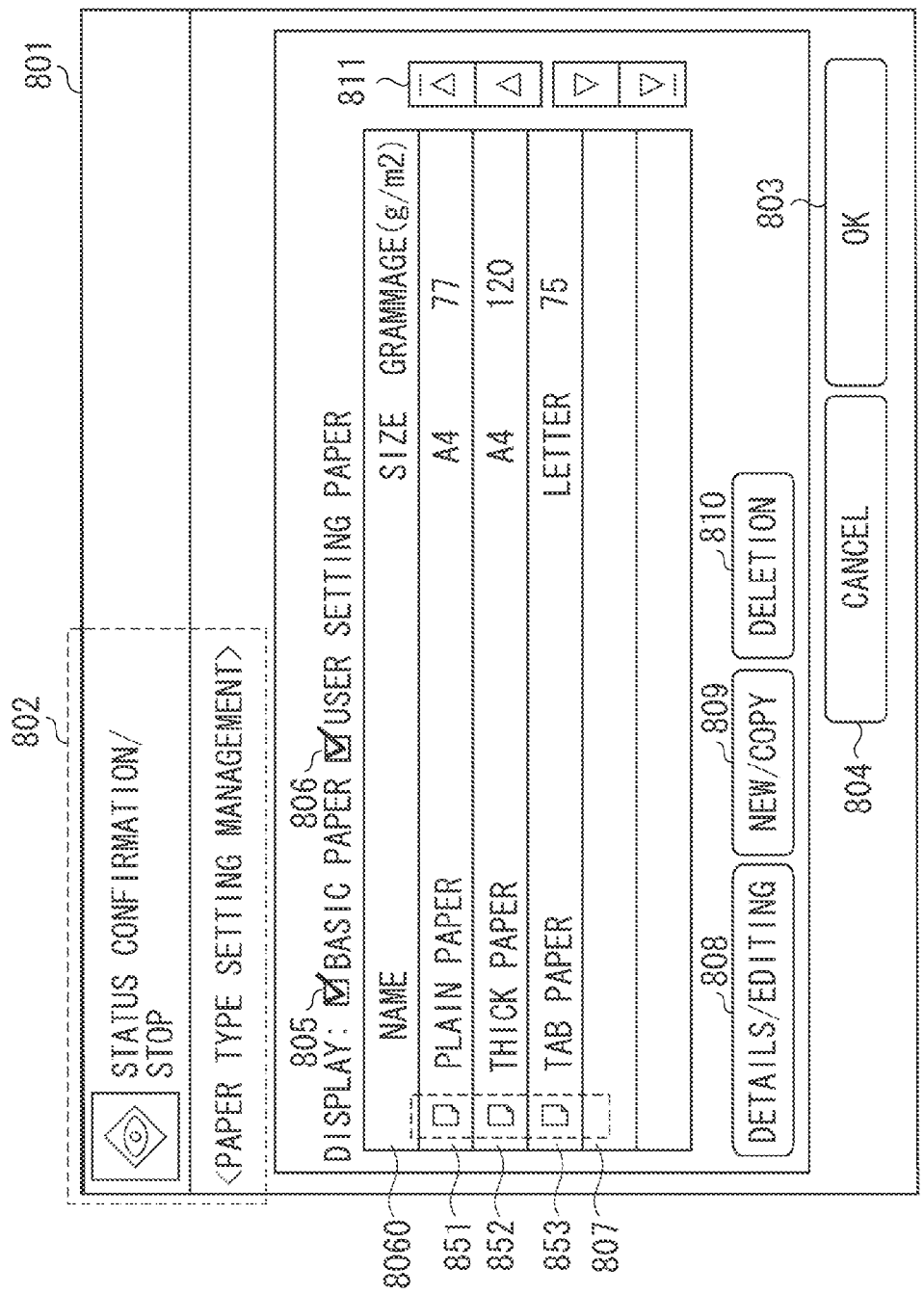
FIG. 5 illustrates a second example of the operation screen.

If the paper type setting management button 706 is pressed, the image processing apparatus 103 displays an operation screen 801 illustrated in FIG. 5. The operation screen 801 includes items 802 to 804 that are similar to the items 702 to 704 illustrated in FIG. 4, and therefore the description thereof is not repeated. The operation screen 801 illustrated in FIG. 5 is a screen that is usable to perform paper type setting management. The paper type, which can be set via the operation screen 801, is either basic paper or user setting paper. The basic paper is an initially defined paper type, which cannot be edited or deleted by the administrator. The user setting paper is a paper type that can be newly registered, edited, and deleted by the administrator. The administrator can check a basic paper checkbox 805 or a user setting paper checkbox 806 to select an intended paper to be displayed in the screen 801. The operation screen 801 illustrated in FIG. 5 includes three basic papers "plain paper 851", "thick paper 852", and "tab paper 853" registered beforehand. Even when the user setting paper checkbox 806 is checked in the screen illustrated in FIG. 5, no user setting paper can be displayed if there is not any user setting paper registered beforehand.

The screen illustrated in FIG. 5 is a paper type setting management list including the uppermost line 8060 that indicates display contents. An icon 807 is attached to the head of each paper type so that a user can easily discriminate between each basic paper and the user setting paper. Further, a scroll button 811 is provided on the right side of the list. If there are so many paper types that cannot be displayed together on a single screen, it is useful to provide two or more screens to enable a user to select a screen including an intended paper type to be displayed on the list. Another screen can include a similar scroll button in a case where a list is displayed on the screen. The scroll button can be used in the same manner in each screen, and therefore it is not described in detail.

The list illustrated in FIG. 5 further includes a details/editing button 808, a new/copy button 809, and a deletion button 810. The administrator presses the new/copy button 809 to generate a new user setting paper. If the new/copy button 809 is pressed, the operation screen display shifts to a details setting screen illustrated in FIG. 6. As understood from the screen illustrated in FIG. 5, it is necessary to set a plurality of attributes for each paper type. If the information about an existing paper type except for the paper name is used, the administrator can select an intended paper type from the list illustrated in FIG. 5 and press the new/copy button 809. Through this operation, a copy of the selected paper type can be created. Then, the operation screen shifts to the details setting screen illustrated in FIG. 6, and the administrator can edit each attribute as intended thereon.

In a case where the list illustrated in FIG. 5 includes an intended user setting paper, the administrator selects it and press the details/editing button 808. The operation screen display shifts to the details setting screen illustrated in FIG. 6. The administrator can edit each attribute. If the administrator selects a basic paper and presses the details/editing button 808, an error screen informing that the basic paper is not editable is displayed. The operation screen returns to the screen illustrated in FIG. 5.

In a case where the list illustrated in FIG. 5 includes an intended user setting paper, the administrator selects it and press the deletion button 810 to delete the selected user setting paper. If the administrator selects a basic paper and presses the deletion button 810, an error screen informing that the basic paper cannot be deleted is displayed. The operation screen returns to the screen illustrated in FIG. 5.

<FIG. 6>

Figure 6:
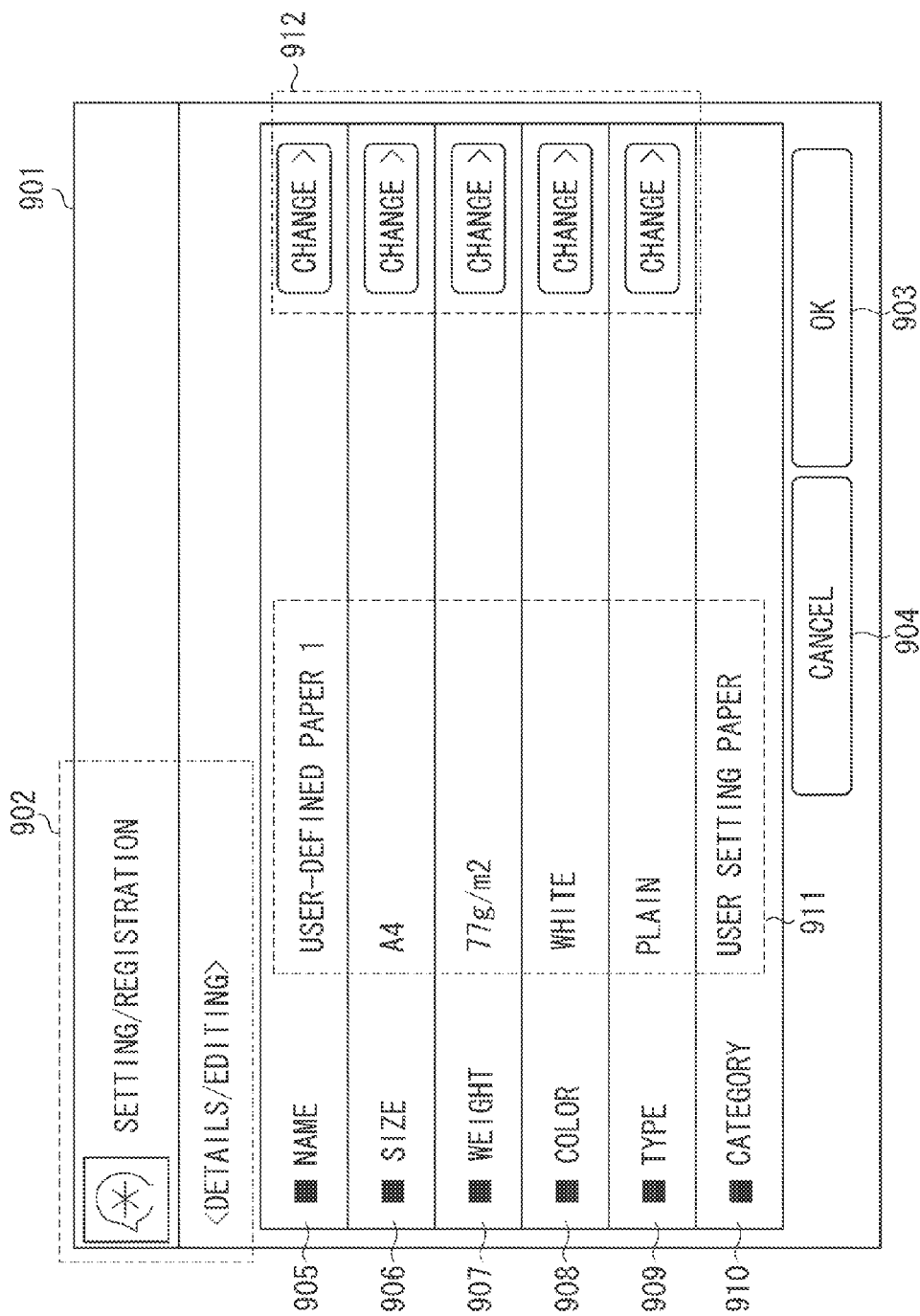
FIG. 6 illustrates a third example of the operation screen.

If the details/editing button 808 or the new/copy button 809 is pressed, the image processing apparatus 103 displays the details/editing screen illustrated in FIG. 6. The screen illustrated in FIG. 6 enables the administrator to edit a user setting paper. The administrator can edit each of a plurality of attributes, e.g., name 905, size 906, weight 907, color 908, type 909, and category 910, defined for a user setting paper on the screen illustrated in FIG. 6.

The name 905 is an attribute to be displayed as a paper name to identify each paper type illustrated in FIG. 5 or FIG. 7, or illustrated in each of FIG. 8, FIG. 10, FIG. 12, and FIG. 17. A user can discriminate individual paper from other papers based on the name allocated to each paper.

The size 906 is an attribute that designates the size, such as A4 or Letter, of each user setting paper.

The weight 907 is an attribute that indicates the weight per unit area, which may be referred to as "grammage", of each user setting paper. In the present exemplary embodiment, the unit employed to express information in the weight 907 field is "$g/m^2$." However any other unit can be used. The color 908 is an attribute that indicates the color of each user setting paper. In the present exemplary embodiment, the color designated in the color 908 field is a general color (e.g., white, red, or blue). However, another color such as a color sample published by Dainippon Ink and Chemicals, Incorporated is employable if it can be discriminated from other colors.

The type 909 is an attribute that represents the type of each user setting paper. The generally known type is "plain" that is allocated to plain papers and thick papers, "tab" that can be allocated to tab papers, or "transparency" that can be allocated to OHP papers. Further, a combination of the type 909 and a subsidiary attribute may be required depending on the type of a paper. For example, a pre-punched paper may include a subsidiary attribute "two-hole (the type of hole)" in addition to a main attribute "plain" having been set as type 909. In this case, a paper having an attribute "plain" as the type 909 can be discriminated as a pre-punched paper if there is a setting relating to the type of hole and can be discriminated as a plain paper if there is not any type-of-hole setting.

The category 910 is an attribute that indicates basic paper, user setting paper, or provisional paper (described below). Accordingly, the administrator cannot edit the category 910. The CPU 211 performs a setting operation for information to be stored in the category 910 field based on a program.

FIG. 6 illustrates an example of the user setting paper, including an input field 911 for edited attribute values. Further, the administrator presses any one of change buttons in a field 912 to change the displayed attribute value to another value and edit the value on the setting screen. For example, the name allocated beforehand to the user setting paper is "user-defined paper 1." If the administrator wants to change the name, the administrator selects and presses the uppermost button in the change button field 912. The administrator can change the remaining attribute information similarly.

<FIG. 7>

FIG. 7 illustrates a list to be displayed when the user setting paper named "user-defined paper 1" (see line 854 in FIG. 7) is newly generated. The list illustrated in FIG. 7 is different from the list illustrated in FIG. 5 in that the icon attached to the head of the line 854 is different from the icon attached to each basic paper. Differentiating the icon as mentioned above is useful for the administrator to discriminate the user setting paper from the basic papers in the category 910. Further, if only the basic paper checkbox 805 is checked, only three papers 851 to 853 illustrated in FIG. 7 can be displayed. If only the user setting paper checkbox 806 is checked, only one paper 854 illustrated in FIG. 7 is displayed.

As mentioned above, the administrator can generate a user setting paper appropriately in addition to the basic papers and can set its attributes accurately.

<FIG. 8>

Next, paper feeding stage paper setting is described in detail below. A general user calls the operation screen illustrated in FIG. 4, presses the paper feeding stage paper setting button 705, and starts a setting operation. The operation screen display shifts to an operation screen illustrated in FIG. 8. Items 1001 to 1004 illustrated in FIG. 8 are similar to the items 701 to 704 illustrated in FIG. 4, and therefore redundant description thereof will be avoided. The screen illustrated in FIG. 8 enables a general user to perform settings for papers stored in respective paper feeding stages.

An appearance illustration 1005 represents the image processing apparatus that is currently in use, in which all of settable paper feeding stages are explicitly displayed. For example, four paper feeding stages 1 to 4 are located on the lower side of the image processing apparatus. An expansion paper feeding stage 5 is connected to the right side of the image processing apparatus body. Further, a manual paper feeding stage (i.e., a paper feeding stage dedicated to manual feeding) is located at an upper right portion of the image processing apparatus body. A list of types of papers to be fed from the paper feeding stages 1 to 5 and the manual paper feeding state (see lines 1051 to 1056) is provided on the right side of the appearance illustration. For example, detailed information about the paper feeding stage 1 is displayed on the line 1051. From the display of line 1051, a general user can understand that plain papers (see field 1007) each having A4 size (see field 1006) are accommodated in the paper feeding stage 1.

<FIGS. 9A and 9B>

The screen illustrated in FIG. 9A displays paper types that can be processed by the image processing apparatus currently in use. The screen illustrated in FIG. 9A includes items 1101 to 1104 that are similar to the items 701 to 704 illustrated in FIG. 4, and therefore redundant description thereof will be avoided. The screen illustrated in FIG. 9A is different from the screen illustrated in FIG. 5 in that a detailed information button 1109 is newly provided although the details/editing button 808, the new/copy button 809, and the deletion button 810 are omitted. More specifically, a general user can check each of selectable paper types and confirm detailed information (e.g., attributes) about each paper type on the screen illustrated in FIG. 9A. According to the screen illustrated in FIG. 9A, only three basic papers (see line 1151 to line 1153) are selectable. However, as described with reference to FIG. 5, FIG. 6, and FIG. 7, if the user setting paper "user-defined paper 1" is once generated, the "user-defined paper 1" can be displayed in a line 1154 as illustrated in FIG. 9B.

Figure 10:
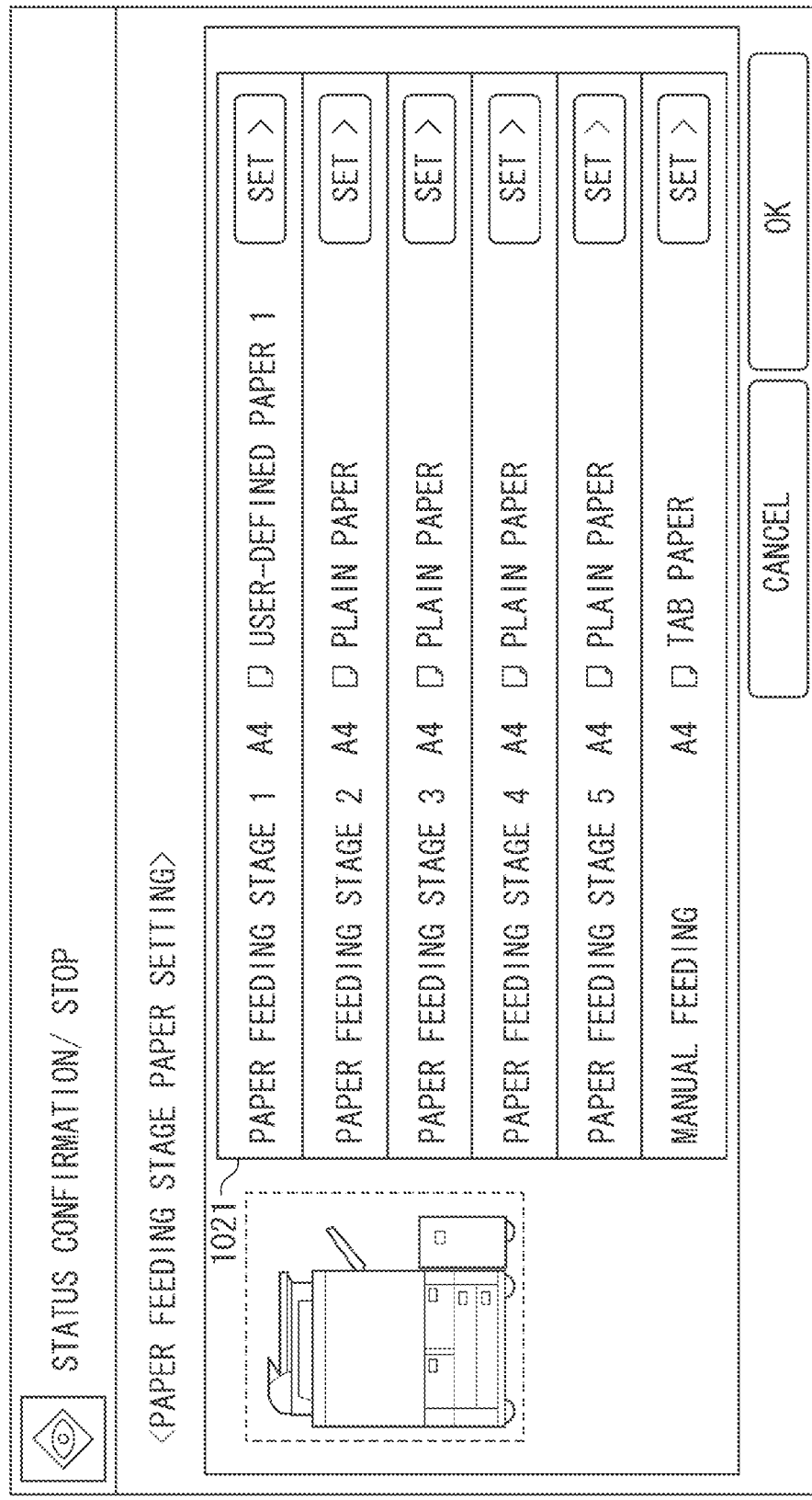
FIG. 10 illustrates an eighth example of the operation screen.

Next, an example method for setting a user setting paper for the paper feeding stage 1 on the paper feeding stage paper setting screen illustrated in FIG. 8 is described in detail below. To change the settings for the paper feeding stage 1, a general user presses a setting button 1008 in the line 1051 of the paper feeding stage 1. The operation screen display shifts to the screen illustrated in FIG. 9B. The general user selects the "user-defined paper 1" in the line 1154 illustrated in FIG. 9B and presses the OK button. The setting of the "user-defined paper 1" for the paper feeding stage 1 completes through the above-mentioned procedure. FIG. 10 illustrates an operation screen including the "user-defined paper 1" displayed in a line 1021 of the paper feeding stage 1.

<Summary>

As describe above, a role sharing between an administrator and a general user can be realized in such a manner that the administrator performs paper type setting management and the general user selects a desired one of the managed paper types and performs paper settings for a paper feeding stage. Therefore, the general user cannot freely register a user setting paper as intended. On the other hand, if the administrator allows every general user to have authority to manage paper type settings, the paper type setting management becomes uncontrollable and the reliability of the registered user setting paper deteriorates although each general user can freely register a user setting paper as intended. In such a situation, a general user newly registers a user setting paper each time when the user generates the user setting paper, rather than selecting an appropriate one of the user setting papers registered under the paper type setting management. Accordingly, a problem occurs when a general user is allowed to register a new user setting paper. In view of the foregoing, a method capable of solving the above-mentioned problem is proposed.

<Method Using a Provisional Paper>

A general user wants to newly register a user setting paper and perform paper settings for a paper feeding stage. First, the general user calls the screen illustrated in FIG. 4. In this case, the user setting paper that the general user wants to use is not registered in the paper type setting management. More specifically, the target user setting paper is not yet displayed as illustrated in FIG. 9A when the screens illustrated in FIGS. 9A and 9B are called. The general user presses the paper feeding stage paper setting button 705 on the screen illustrated in FIG. 4. As mentioned above, the operation screen display shifts to the screen illustrated in FIG. 8. The general user presses the setting button 1008 of the desired paper feeding stage on the screen illustrated in FIG. 8.

<FIG. 11>

Figure 11:
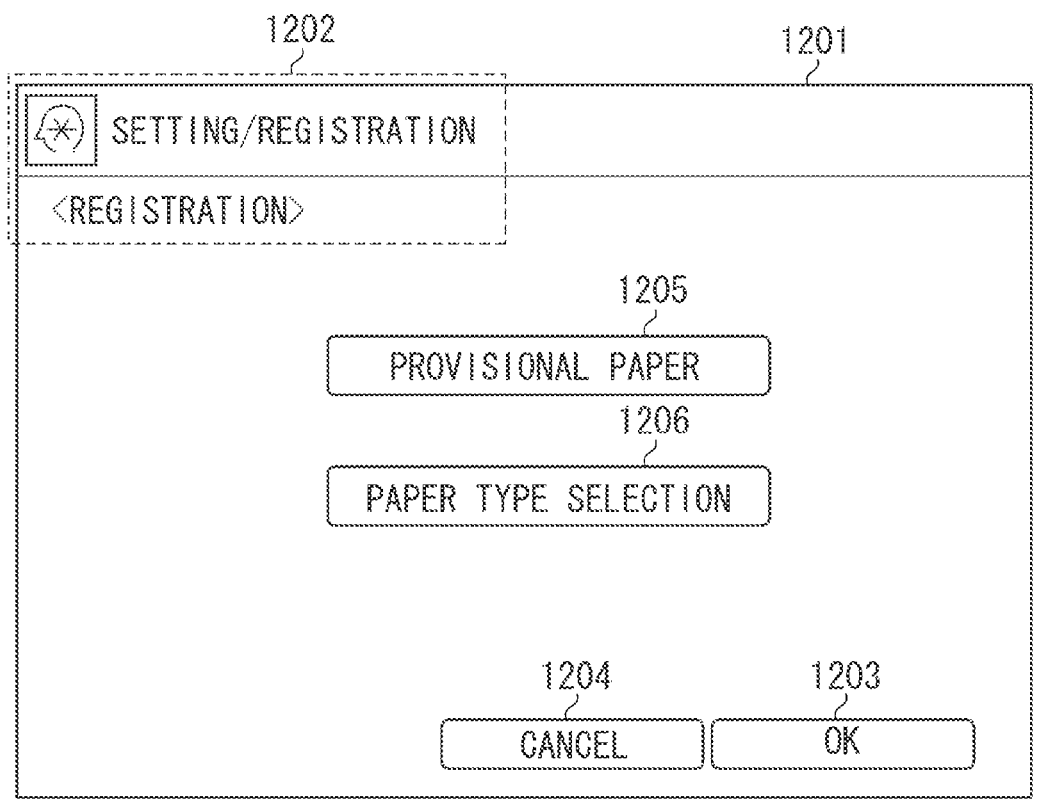
FIG. 11 illustrates an example of a provisional paper setting screen.

Then, the operation screen display shifts to a screen illustrated in FIG. 11. FIG. 11 illustrates a screen that allows the general user to instruct whether to use a provisional paper because the user setting paper that the general user wants to use is not yet registered or select an appropriate one of the paper types whose settings are managed by the administrator. The operation screen illustrated in FIG. 11 includes items 1201 to 1204 that are similar to the items 701 to 704 illustrated in FIG. 4, and therefore redundant description thereof will be avoided. Two buttons provided in the center of FIG. 11 are a provisional paper button 1205 and a paper type selection>> button 1206. If the general user wants to use the provisional paper, the general user presses the provisional paper button 1205. If the general user wants to select an appropriate one of the paper types whose settings are managed by the administrator, the general user presses the paper type selection>>button 1206. If the button 1206 is pressed, the operation screen display shifts to the screen illustrated in FIG. 9A or FIG. 9B as mentioned above. The general user selects one of the listed paper types on the screen. If the provisional paper button 1205 is pressed and an instruction to register a provisional paper is received, the image processing apparatus automatically sets "provisional paper 1" for a desired paper feeding stage. The operation screen display shifts to a screen illustrated in FIG. 12. As understood from FIG. 12, the provisional paper named "provisional paper 1" is set for the paper feeding stage 1, i.e., for the desired paper feeding stage (see field 1031). An icon 1032 attached to the provisional paper is different from the icon attached to the basic paper and the user setting paper, so that the provisional paper can be easily identified.

The screen illustrated in FIG. 11 is an example of a receiving unit configured to receive an instruction to register a provisional paper when a paper type is set for a paper feeding stage.

<FIG. 13: Paper Brand DB>

FIG. 13 illustrates an example of a paper brand DB 400. The paper brand DB 400 stores a plurality of pieces of paper information. The paper brand DB 400 can be expressed using a table including fields of ID 402, name 403, size 404, weight 405, color 406, type 407, and category 408. Another attribute may be usable to realize a fine control for the image processing apparatus, although not described in the present exemplary embodiment because such an attribute is equivalent to the above-mentioned attributes (i.e., weight 405, color 406, and type 407) from the viewpoint of the paper brand DB 400.

The ID 402 is an identifier usable to discriminate each paper type uniquely. Other attributes are similar to those described with reference to FIG. 6. Further, paper types 421 to 426 are examples registered and managed in the paper brand DB 400. The plain paper 421, the thick paper 422, and the tab paper 423 are basic papers to which a numerical value "1" is allocated in the category 408 field. Information about these basic papers is fixed and not changeable. The "user-defined paper 1" (see line 424) to which a numerical value "2" is allocated in the category 408 field is a user setting paper. The administrator can edit information about the "user-defined paper 1", as described with reference to FIG. 6. The "provisional paper 1" (see line 425) to which a numerical value "3" is allocated in the category 408 field is a provisional paper that has been generated in response to selection of the provisional paper button 1205, as described with reference to FIG. 11.

Example processing to be performed for the paper brand DB 400 when the user setting paper described with reference to FIG. 6 is generated is described in detail below. To realize the above-mentioned processing, the CPU 211 executes a part or the whole of a program loaded from the ROM 212 to the RAM 213 to cause the control processing unit 301 to perform processing in cooperation with another processing unit illustrated in FIG. 3.

The paper brand processing unit 303 refers to and edits the paper brand DB 400 stored in the memory unit 306 via the control processing unit 301. More specifically, in this case, a user selects the plain paper from the list illustrated in FIG. 5 and presses the new/copy button 809.

The paper brand processing unit 303 copies attribute information about the plain paper, except for ID, name, and category, and pastes the copied attribute information in the last part of the table (see line 424 in FIG. 13) included in the paper brand DB 400. ID information is uniquely allocated to each line. Therefore, ID "0004" is allocated to the pasted attribute information. A default name allocated in the name 403 filed is "user-defined paper N", in which "N" is a natural number uniquely determined in the paper brand DB. According to the example illustrated in FIG. 13, the allocated natural number is "1" because the user setting paper is initially generated. The numerical value allocated to the user setting paper in the category 408 field is "2." As mentioned above, when a user selects the plain paper and presses the new/copy button 809, the paper brand processing unit 303 sets attribute values in the line 424 of the table illustrated in FIG. 13.

Then, as mentioned above, the operation screen illustrated in FIG. 6 is displayed. The display processing unit 304 acquires attribute values from the line 424 of the paper brand DB 400 stored in the memory unit 306, as information required to display the screen illustrated in FIG. 6, via the control processing unit 301 and displays the acquired attribute information. Further, if the user inputs an intended value on the changing screen and presses the change button 912 illustrated in FIG. 6, the paper brand processing unit 303 changes the corresponding value in the line 424 of the paper brand DB 400 via the control processing unit 301. For example, the user can change the name to a new name that is easy to remember. The operation screen illustrated in FIG. 6 does not include any change button 912 that corresponds to the category 408 because each user is not allowed to change the category information as mentioned above. Only the paper brand processing unit 303 can process the category information. Similarly, only the paper brand processing unit 303 can process ID information in the ID 402 field. To prevent each user from unnecessarily paying attention to the ID information, the operation screen illustrated in FIG. 6 does not include any ID related information. In identifying the paper type, the user can refer to the name given to each user setting paper, similar to the basic papers (e.g., plain paper 421, thick paper 422, and tab paper 423). Accordingly, each user is allowed to change (or select) the name so that the user can identify the paper type easily.

<Mechanism for Giving Authority Only to the Administrator>

As mentioned above, only the administrator can generate, edit, and delete the user setting paper. A mechanism capable of realizing the above-mentioned features is described below. First, a method for discriminating between an administrator and a general user is known as a conventional technique. For example, it is useful to check if an operator currently logging on an image processing apparatus is an administrator. Using the above-mentioned method, the control processing unit 301 can determine whether the administrator is currently operating the image processing apparatus. When the operator of the image processing apparatus is the administrator, the paper brand processing unit 303 performs processing for generating, editing, and deleting a user setting paper. When the operator of the image processing apparatus is a general user, the paper brand processing unit 303 does not perform any processing. In other words, only the administrator is authorized to generate, edit, and delete the user setting paper.

<FIG. 14: Paper Feeding Stage Setting DB>

FIG. 14 illustrates an example of a paper feeding stage setting DB 500. The paper feeding stage setting DB 500 can be expressed using a table including fields of paper feeding stage 501, ID 502, name 503, size 504, weight 505, color 506, type 507, and category 508. The attribute information (i.e., ID 502 to category 508) illustrated in FIG. 14 is similar to the attribute information (i.e., ID 402 to category 408) of the paper brand DB 400 illustrated in FIG. 13. In other words, the paper feeding stage setting DB 500 includes attribute values copied and pasted from the paper brand DB 400, as described in detail below. Further, the paper feeding stage setting DB 500 includes a plurality of lines that corresponds to the maximum number of paper feeding stages of the image processing apparatus. According to the example illustrated in FIG. 8, the image processing apparatus includes four paper feeding stages 1 to 4 located on the lower side of the image processing apparatus body, one expansion paper feeding stage 5 connected to the right side of the image processing apparatus body, and one manual paper feeding stage. Therefore, the paper feeding stage setting DB 500 includes six lines.

Example processing, in which a user presses the setting button 1008 of the paper feeding stage 1 illustrated in FIG. 8, selects the "user-defined paper 1" in the operation screen illustrated in FIG. 9B, and sets the "user-defined paper 1" for the paper feeding stage 1, is described in detail below. To realize the above-mentioned processing, the CPU 211 executes a part or the whole of the program loaded from the ROM 212 to the RAM 213 in such a way as to cause the control processing unit 301 to perform processing in cooperation with another processing unit illustrated in FIG. 3.

The paper feeding stage processing unit 302 refers to and edits the paper feeding stage setting DB 500 stored in the memory unit 306 via the control processing unit 301. The user sets the "user-defined paper 1" for the paper feeding stage 1 on the screen illustrated in FIG. 9B. Then, the paper feeding stage processing unit 302 copies attribute values of ID 402 to category 408 from the line 424 of the paper brand DB 400 and pastes the copied attribute information in corresponding fields of ID 502 to category 508 of the designated paper feeding stage 1 (see line 521). When the setting of the paper feeding stage completes, the operation screen display shifts to the screen illustrated in FIG. 10. In this case, the display processing unit 304 refers to the paper feeding stage setting DB 500 stored in the memory unit 306 via the control processing unit 301, and displays paper feeding stage information.

Figure 15:
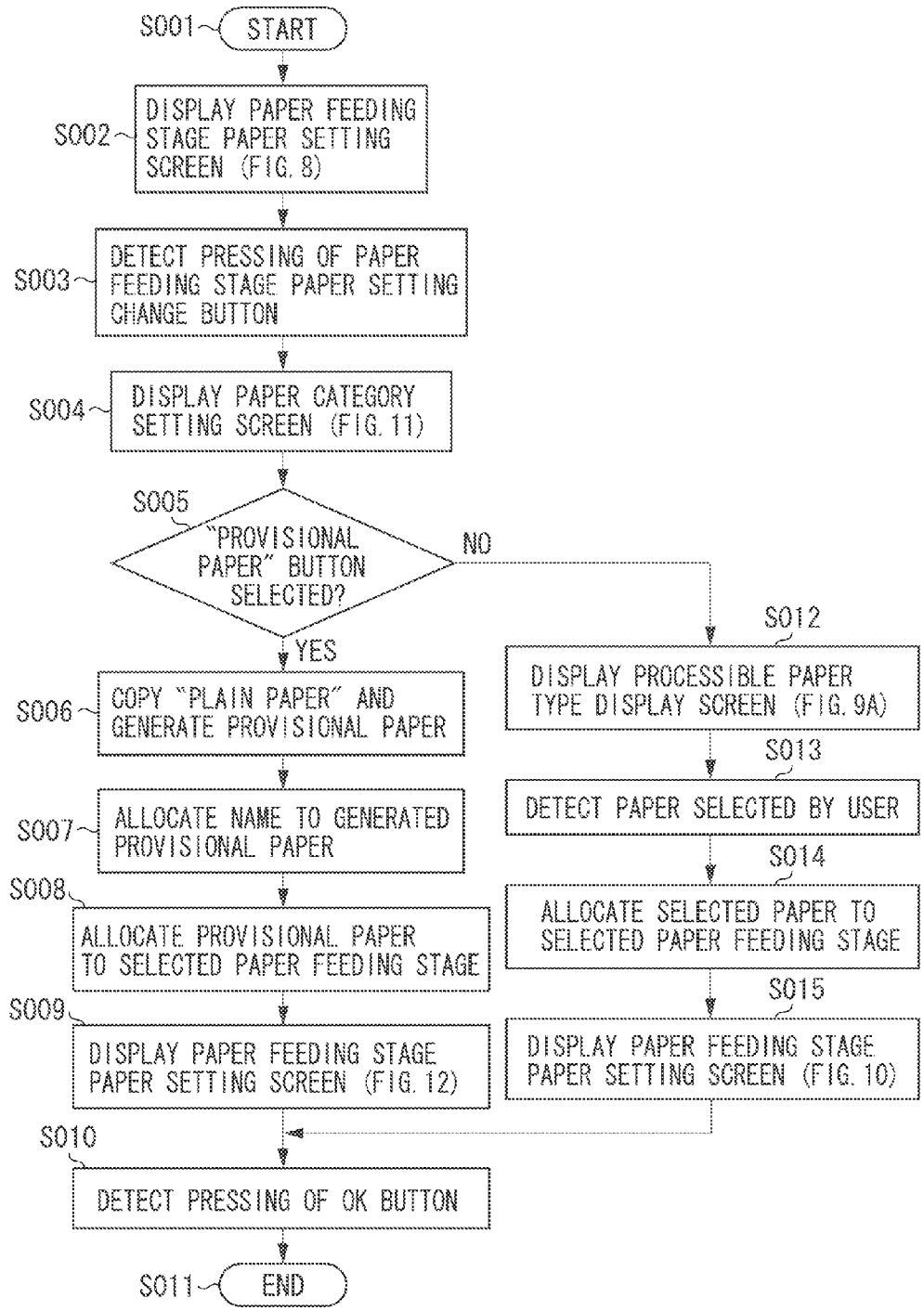
FIG. 15 is a flowchart illustrating an example of provisional paper setting processing.

<FIG. 15: Flowchart 1>

FIG. 15 is a flowchart 1 illustrating an operation that can be performed by the image processing apparatus, which includes a screen transition (FIG. 4→FIG. 8→FIG. 11→FIG. 12) to be performed when a provisional paper is used. To realize the processing of the flowchart 1, the CPU 211 executes a part or the whole of the program loaded from the ROM 212 to the RAM 213 in such a way as to cause the control processing unit 301 to perform processing in cooperation with another processing unit illustrated in FIG. 3. The processing according to the flowchart illustrated in FIG. 15 is an example of provisional paper setting processing.

If a user presses the paper feeding stage paper setting button 705 illustrated in FIG. 4, then in step S001, the image processing apparatus starts the following processing.

In step S002, the display processing unit 304 displays the paper feeding stage paper setting screen (see FIG. 8) on the display/operation device 220. In this case, as described with reference to the paper feeding stage setting, the display processing unit 304 refers to the paper feeding stage setting DB 500 stored in the memory unit 306 via the control processing unit 301, and displays paper feeding stage information.

In step S003, if the input processing unit 305 detects any pressing action on the screen, as mentioned above, the input processing unit 305 determines that the user has pressed the button to change paper settings for the paper feeding stage. The input processing unit 305 transmits a button pressing notification to the control processing unit 301.

In step S004, in response to the above-mentioned notification, the control processing unit 301 controls the display processing unit 304 to display the screen illustrated in FIG. 11. As mentioned above, the screen illustrated in FIG. 11 includes the provisional paper button 1205 and the paper type selection>>button 1206.

In step S005, the input processing unit 305 determines whether the user has pressed the provisional paper button 1205. If the input processing unit 305 determines that the provisional paper button 1205 has been pressed (Yes in step S005), the operation proceeds to step S006. If the input processing unit 305 determines that the paper type selection>>button 1206 has been pressed (No in step S005), the operation proceeds to step S0012. If the cancel button 1204 or the OK button 1203 is pressed, the operation screen display returns to the previous screen, although not described in the flowchart 1.

Pressing the paper type selection>>button 1206 is an example of a first instruction. Pressing the provisional paper button 1205 is an example of a second instruction.

In step S006, the control processing unit 301 controls the paper brand processing unit 303 in such a way as to copy attribute values of size 404, weight 405, color 406, and type 407 of the plain paper 421 to which the numerical value "1" is allocated in the category 408 field of the paper brand DB 400. Then, the control processing unit 301 controls the paper brand processing unit 303 in such a way as to paste the copied attribute information in a blank line of the paper brand DB 400. In this case, a numerical value allocated to the blank line is stored in the ID 402 field. The numerical value "3" indicating a provisional paper is stored in the category 408 field, as mentioned above. Only the administrator can edit the paper brand DB 400 as described with reference to the paper brand DB 400 illustrated in FIG. 13. However, when the provisional paper button 1205 is pressed, the paper brand processing unit 303 performs the above-mentioned copy-and-paste processing irrespective of an operator (i.e., a general user or the administrator) who has pressed the provisional paper button 1205.

Paper information about the plain paper is an example of specific type paper information.

In step S007, the control processing unit 301 causes the paper brand processing unit 303 to set name 403 for the provisional paper in the paper brand DB 400. The default name allocated in the name 403 field is "provisional paper N", in which "N" is a natural number uniquely determined in the paper brand DB. According to the example illustrated in FIG. 13, the allocated numerical value is "1" because the user setting paper is initially generated. When the above-mentioned processing in steps S006 and S007 has been completed, the provisional paper named "provisional paper 1" is registered in the paper brand DB 400, as illustrated in the line 425 illustrated in FIG. 13.

In step S008, the control processing unit 301 causes the paper feeding stage processing unit 302 to allocate the "provisional paper 1" to the selected paper feeding stage. A method employable in this case is similar to the method for setting a user setting paper for a paper feeding stage on the paper feeding stage setting DB 500 illustrated in FIG. 14. More specifically, the control processing unit 301 copies attribute values of ID 402 to category 408 of the provisional paper (see line 425) from the paper brand DB 400, which have been registered in steps S006 and S007 and pastes the copied attribute information in the corresponding fields ID 502 to category 508 of the designated paper feeding stage 1 (see line 521). FIG. 16 illustrates the paper feeding stage setting DB 500 obtainable after the above-mentioned paste processing has been completed. The paper feeding stage setting DB 500 illustrated in FIG. 16 includes information about the provisional paper registered for the paper feeding stage 1 (see line 531).

Figure 12:
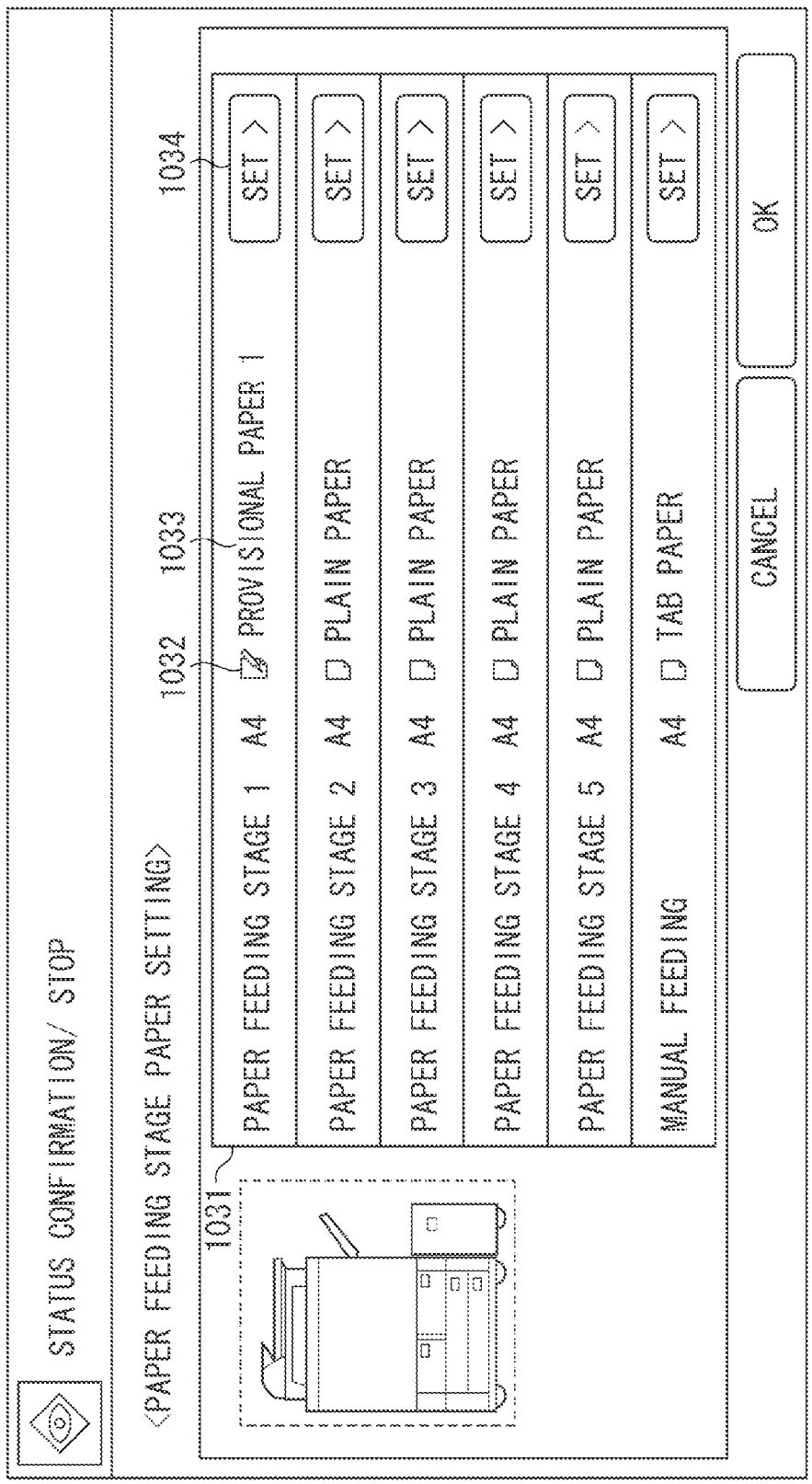
FIG. 12 illustrates a first example of a paper feeding stage paper setting screen.

In step S009, the display processing unit 304 displays the paper feeding stage paper setting screen illustrated in FIG. 12. As described in step S002, the display processing unit 304 refers to the paper feeding stage setting DB 500 and displays paper feeding stage information. Accordingly, as described in step S008, the provisional paper can be registered for the paper feeding stage 1.

In step S010, the control processing unit 301 detects an OK button pressing action performed by the user on the screen illustrated in FIG. 12 and completes the processing of the flowchart 1.

Processing in steps S012 to S015 is performed to select an existing basic paper or a user setting paper (not the provisional paper), as conventionally known, and therefore redundant description thereof will be avoided.

<Registering Provisional Paper for a Plurality of Paper Feeding Stages Simultaneously>

In the above-mentioned example, the image processing apparatus performs paper settings for only one paper feeding stage when the setting button 1008 illustrated in FIG. 8 is pressed. However, a user may want to perform the same settings for a plurality of paper feeding stages simultaneously, for example, when the image processing apparatus performs printing using a great amount of provisional papers that cannot be accommodated in a single paper feeding stage. In such a case, the provisional papers are fed from two or more paper feeding stages. More specifically, when the feeding of provisional papers from one paper feeding stage has been completed, the image processing apparatus automatically starts feeding provisional papers from another paper feeding stage.

An example method for realizing the above-mentioned desire is described in detail below.

First, an example method for selecting a plurality of paper feeding stages is described below. The screen illustrated in FIG. 8 includes the setting button 1008 dedicated to each paper feeding stage. Therefore, a general user presses a plurality of setting buttons 1008 that corresponds to the paper feeding stages to be selected simultaneously. The above-mentioned operation is generally referred to as "multi-touch." The input processing unit 305 detects the multi-touch operation performed by the user on a plurality of setting buttons 1008. The input processing unit 305 transmits a notification including information about the individual numbers allocated to the selected plurality of paper feeding stages to the control processing unit 301.

Figure 17:
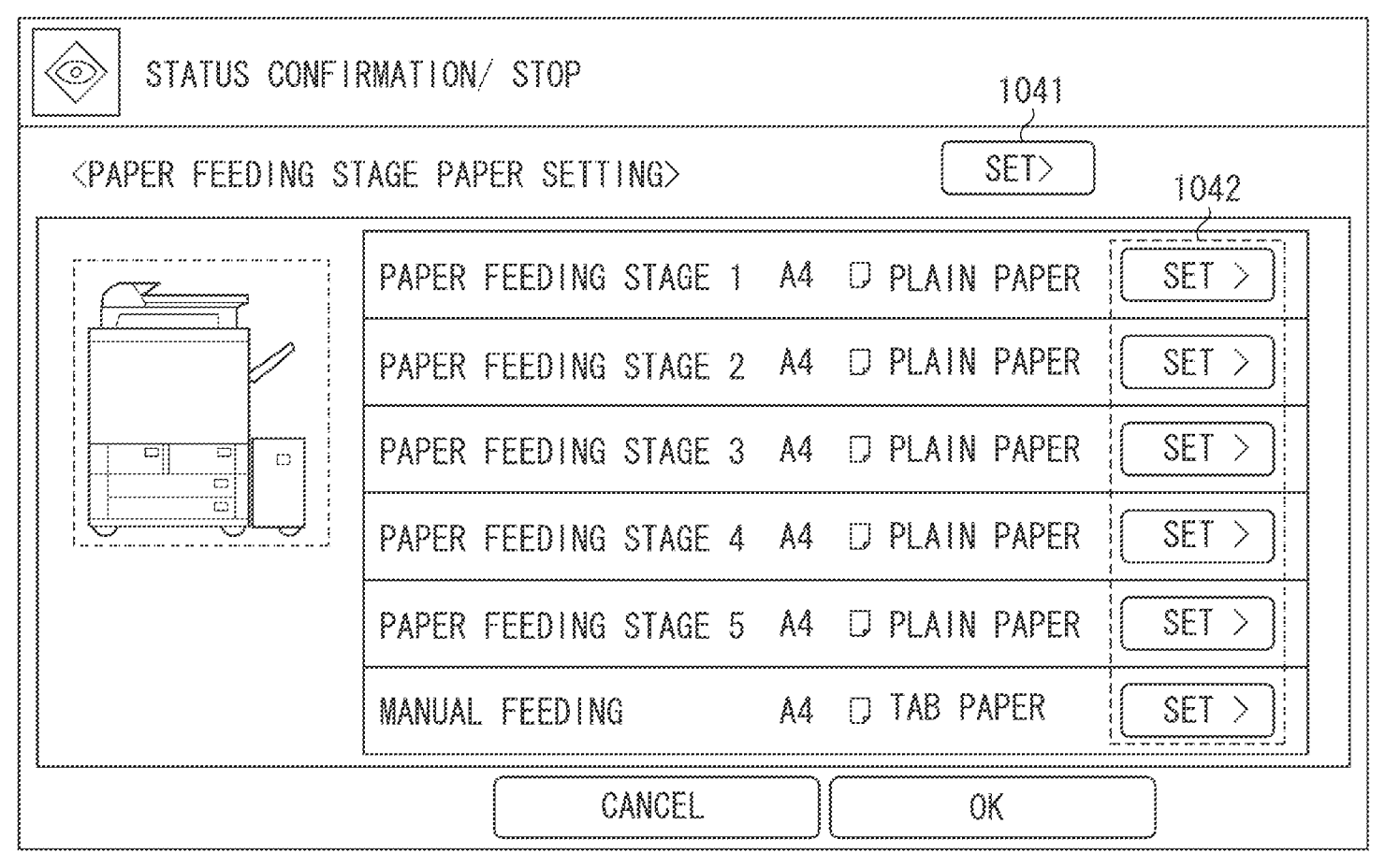

Alternatively, it is useful to prepare another setting screen illustrated in FIG. 17. The screen illustrated in FIG. 17 includes two types of buttons, i.e., a setting button 1041 and selection buttons 1042. The selection buttons 1042 are provided for respective paper feeding stages. When a selection button 1042 is first pressed, the selection is affirmed. However, if the same selection button 1042 is pressed again, the selection is negated. The user presses a plurality of selection buttons 1042 corresponding to the paper feeding stages to be selected and then presses the setting button 1041. The input processing unit 305 detects that the plurality of selection buttons 1042 is selected and the setting button 1041 is pressed, and transmits a notification including information about the individual numbers allocated to the selected plurality of paper feeding stages to the control processing unit 301.

Further, the control processing unit 301 transfers the notification including information about the individual numbers of the plurality of paper feeding stages to the paper feeding stage processing unit 302.

When a plurality of setting buttons 1008 or the selection buttons 1042 of a plurality of paper feeding stages is selected, and the setting button 1041 is pressed, the screen illustrated in FIG. 11 is displayed as mentioned above. If the provisional paper button 1205 is pressed by the user, the image processing apparatus executes processing according to step S006 and subsequent steps of the flowchart 1. In the above-mentioned steps S006 to S008, the provisional paper is set for only the paper feeding stage 1 in the paper feeding stage setting DB 500 (see line 531). The paper feeding stage processing unit 302 performs the same operation in lines corresponding to the notified individual numbers of the plurality of paper feeding stages in the paper feeding stage setting DB 500. In each line, the same values are set in the fields of ID 502 to category 508 because a provisional paper to be set is the same. When the paper setting screen is displayed in step S009, the user can understand that the provisional paper has been set for each of the selected plurality of paper feeding stages.

To set the same provisional paper for each of a plurality of paper feeding stages, if the image processing apparatus repeats the processing in steps S005 to S010 a plurality of times, an intended result cannot be obtained. More specifically, in the second repetition processing, the control processing unit 301 controls the paper brand processing unit 303 in such a way as to paste attribute information (see step S006) in a blank line following the line processed in the first repetition processing. More specifically, the paper brand processing unit 303 pastes the attribute information in the next blank line 426 of the paper brand DB 400 illustrated in FIG. 13. In this case, a new value is set in the ID 402 field for the next blank line. Further, in step S007, the image processing apparatus allocates the default name "provisional paper N" (N is a natural number), i.e., a uniquely determined name, in the name 403 field of the paper brand DB. Accordingly, the name allocated to the provisional paper in the second repetition processing is "provisional paper 2", which can be discriminated as another paper because the name allocated in the first repetition processing is the "provisional paper 1."

<Changing Attribute of Provisional Paper>

When the provisional paper button 1205 illustrated in FIG. 11 is pressed, attribute values of size 404, weight 405, color 406, and type 407 of the provisional paper are set to be identical to those of the plain paper 421 as described in step S006 of the flowchart 1. The paper type most frequently used in the image processing apparatus 103 is the plain paper. Therefore, in many cases, the attribute values of the plain paper are directly used. However, in some cases, it may be desired to set a specific paper type other than the plain paper for the provisional paper. An example method for realizing the above-mentioned desire is described in detail below.

Figure 18:
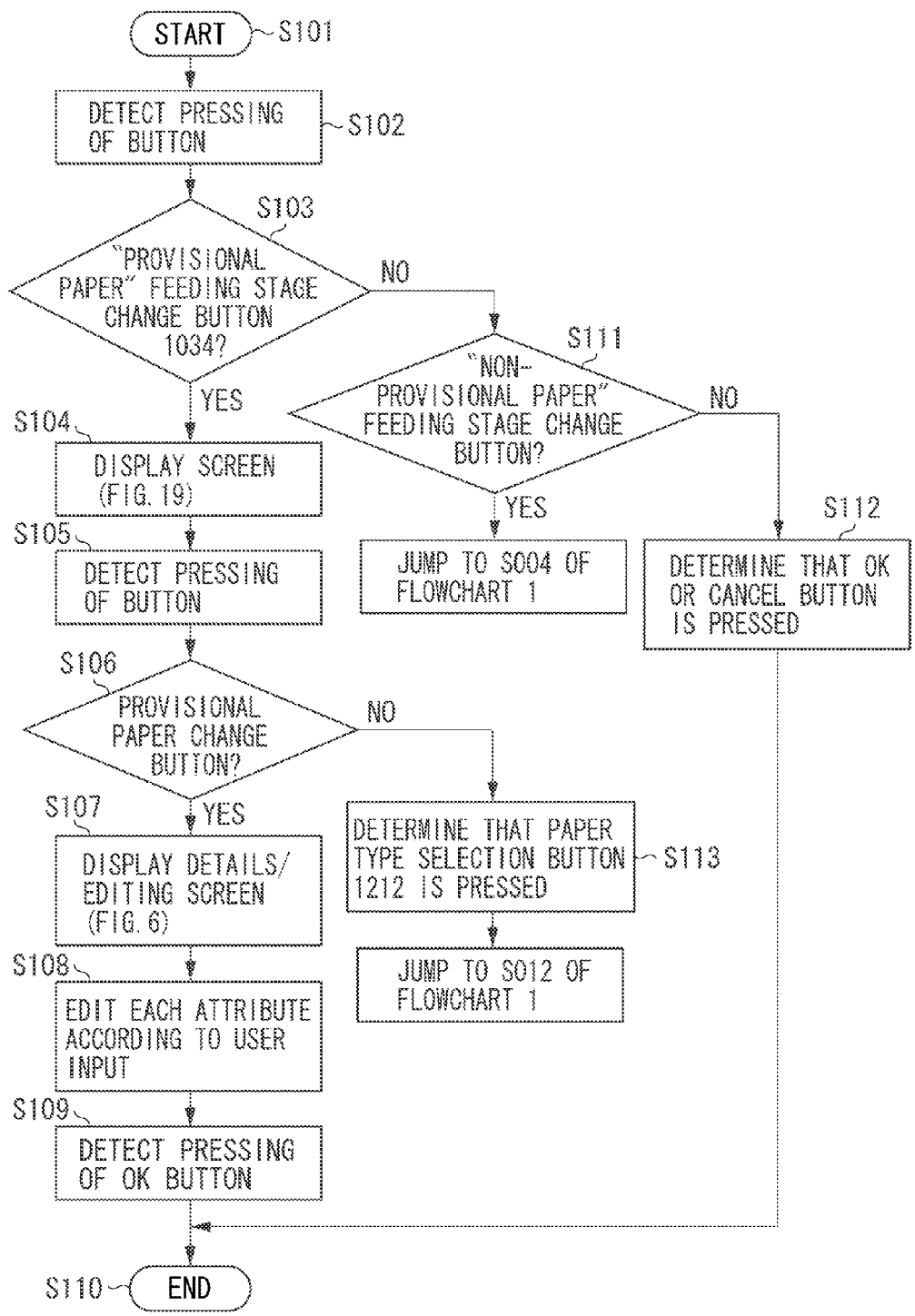
FIG. 18 is a flowchart illustrating an example of paper feeding stage paper setting processing.

The first method is similar to the above-mentioned processing performed in steps S001 to S009 of the flowchart 1. In step S009, the image processing apparatus displays a screen indicating paper types registered for the paper feeding stages illustrated in FIG. 12. In a state where the above-mentioned screen is displayed, the image processing apparatus starts the processing of the flowchart 2 (see step S101 in FIG. 18). Similar to the flowchart 1, to realize the processing of the flowchart 2, the CPU 211 executes a part or the whole of the program loaded from the ROM 212 to the RAM 213 in such a way as to cause the control processing unit 301 to perform processing in cooperation with another processing unit illustrated in FIG. 3. FIG. 18 is a flowchart illustrating an example of paper feeding stage paper setting processing.

In step S102, the input processing unit 305 detects a button pressing action performed by a user.

In step S103, the input processing unit 305 determines whether the pressed button is a "provisional paper" feeding stage change button 1034. If the input processing unit 305 determines that the pressed button is the "provisional paper" feeding stage change button 1034 (Yes in step S103), the operation proceeds to step S104. If the input processing unit 305 determines that the pressed button is not the "provisional paper" feeding stage change button 1034 (No in step S103), the operation proceeds to step S111. The remaining processing of the flowchart 2, which includes detecting a button pressing action, identifying the type of the pressed button, and shifting the operation screen, is similar to that described above and therefore redundant description thereof will be avoided.

In step S111, the input processing unit 305 further determines whether the pressed button is a "non-provisional paper" feeding stage change button. If the input processing unit 305 determines that the pressed button is the "non-provisional paper" feeding stage change button (Yes in step S111), the operation jumps to step S004 of the flowchart 1. In step S004, the control processing unit 301 controls the display processing unit 304 in such a way as to display the screen illustrated in FIG. 11. If the input processing unit 305 determines that the pressed button is not the "non-provisional paper" feeding stage change button (No in step S111), the operation proceeds to step S112. In step S112, the control processing unit 301 determines that the pressed button is the OK button or the cancel button, and completes the processing of the flowchart 2 (the operation proceeds to step S110).

Figure 19:
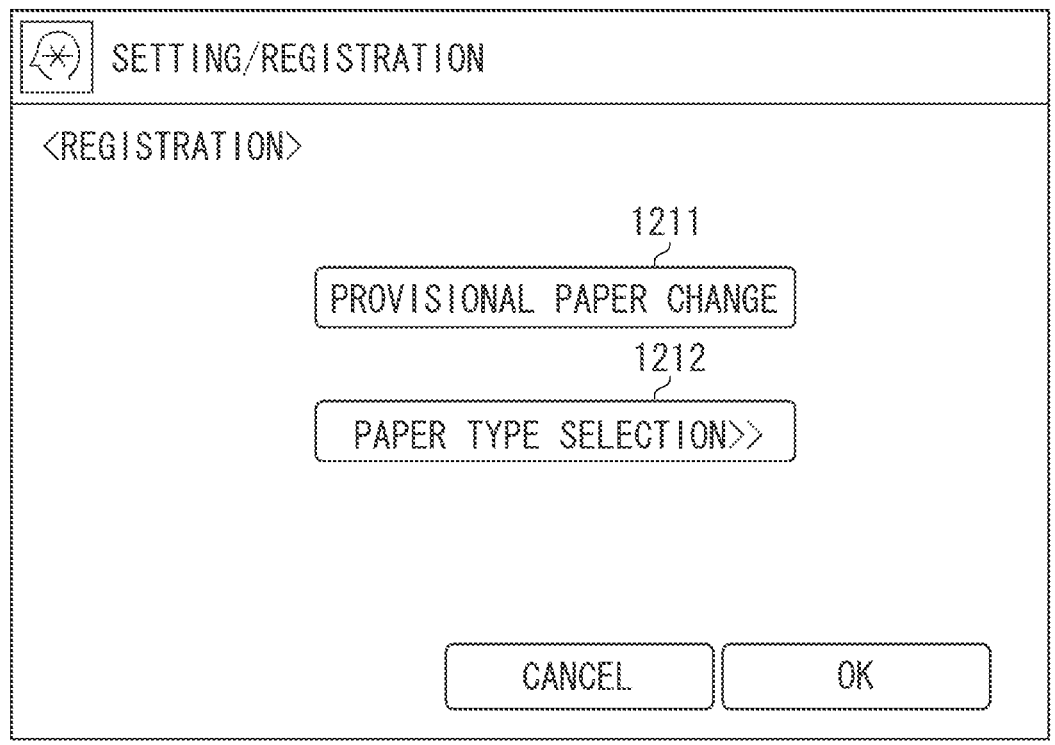
FIG. 19 illustrates an example of a provisional paper changing screen.

In step S104, the display processing unit 304 displays a screen illustrated in FIG. 19. The screen illustrated in FIG. 19 includes a provisional paper change button 1211 and a paper type selection>>button 1212.

In step S105, the input processing unit 305 detects a button pressing action performed by the user.

In step S106, the input processing unit 305 determines whether the pressed button is the provisional paper change button 1211. If the input processing unit 305 determines that the pressed button is the provisional paper change button 1211 (Yes in step S106), the operation proceeds to step S107. If the input processing unit 305 determines that the pressed button is not the provisional paper change button 1211 (No in step S106), the operation proceeds to step S113.

In step S113, the control processing unit 301 determines that the paper type selection>>button 1212 has been pressed. The operation proceeds to step S012 of the flowchart 1. In step S012, the control processing unit 301 controls the display processing unit 304 in such a way as to display the screen illustrated in FIG. 9A.

In step S107, the display processing unit 304 displays the details/editing screen (see FIG. 6). The user is allowed to edit attribute information about the paper type selected on the screen illustrated in FIG. 6. Although FIG. 6 illustrates attribute data of the "user-defined paper 1", if the paper to be processed is the "provisional paper 1", the attribute value in the field 911 in FIG. 6 is replaced by the "provisional paper 1" (see line 425) of the paper brand DB 400.

In step S108, the control processing unit 301 edits each attribute value according to a user input if the details/editing screen change button 912 illustrated in FIG. 6 is pressed. In other words, the plain paper can be processed as another paper through the above-mentioned processing. For example, if the attribute value of weight 907 is changed from 77 g/m$^2$ to 120 g/m$^2$, the "provisional paper 1" can be processed as the thick paper (not the plain paper) as understood from the paper brand DB 400.

Paper information about the paper designated by the user is an example of specific type paper information.

In step S109, if the OK button 903 illustrated in FIG. 6 is pressed, the input processing unit 305 terminates the processing of the flowchart 2 (the operation proceeds to step S110).

Figure 20:
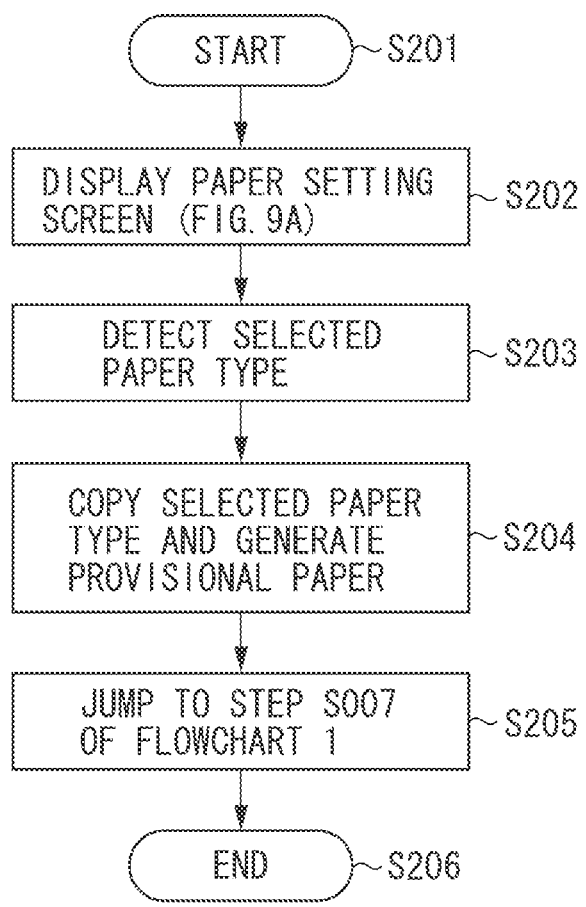
FIG. 20 is a flowchart illustrating an example of provisional paper generation processing.

The second method is similar to the above-mentioned processing performed in steps S001 to S005 of the flowchart 1. If the provisional paper is selected (Yes in step S005), the image processing apparatus starts processing in step S201 of a flowchart 3 illustrated in FIG. 20. FIG. 20 is a flowchart illustrating an example of provisional paper generation processing.

In step S202, the control processing unit 301 controls the display processing unit 304 in such a way as to display the paper setting screen illustrated in FIG. 9A.

When a user generates a provisional paper, the user can select a desired one of the paper types (i.e., plain paper 1151, thick paper 1152, and tab paper 1153) listed in the screen illustrated in FIG. 9A, which is to be copied to generate the provisional paper.

In step S203, the input processing unit 305 detects the paper type selected by the user and transmits a notification about the selected paper type to the control processing unit 301.

The control processing unit 301 notifies the paper feeding stage processing unit 302 of the paper type notified by the input processing unit 305. In step S204, the paper feeding stage processing unit 302 searches for the notified paper type in the paper brand DB 400 and copies attribute information about size 404, weight 405, color 406, and type 407 from the corresponding line, and further pastes the copied attribute information in a blank line of the paper brand DB 400. A value uniquely allocated to the blank line is stored in the ID 402 field, and the numerical value "3" is stored in the category 408 field.

Then, in step S205, the operation jumps to step S007 of the flowchart 1. Then, the control processing unit 301 restarts the processing from step S007 of the flowchart 1.

As mentioned above, in a provisional paper setting operation, a user can copy an arbitrarily selected paper to generate a new provisional paper. In this manner, it is feasible to generate a provisional paper that has attribute values of an arbitrary paper type other than the plain paper.

<Provisional Paper Associated with User Name>

As described above, the unique name "provisional paper N" is given to each provisional paper. However, it is difficult to identify a person who has generated a provisional paper, for example, in an office environment in which a plurality of users can operate the same image processing apparatus.

Therefore, it is useful that the name of a provisional paper includes the name of a user who operates the image processing apparatus.

For example, a card reader configured to read a login ID card can be attached to the expansion device 216. If a user performs a login operation with an ID card, the control processing unit 301 stores a login user name in the memory unit 306. Alternatively, the image processing apparatus may display a login screen on the display/operation device 220 to allow each user to perform a login operation before using the image processing apparatus. If the user performs a login operation on the login screen, the control processing unit 301 stores the login user name in the memory unit 306.

When the paper brand processing unit 303 gives a unique name to a generated provisional paper in step S007 of the flowchart 1, the paper brand processing unit 303 adds a part of the user name stored in the memory unit 306 to the name to be given. For example, when the user name is "Taro Kanou", a unique name "Taro Kanou-provisional paper 1" including a part or the whole of the user name is given by the paper brand processing unit 303.

<Deleting a Provisional Paper after it is Used>

The provisional paper is a paper to be used temporarily. Accordingly, it is not desired that the information of a temporarily generated provisional paper remains in the paper brand DB 400. Therefore, an example method for deleting provisional paper information at appropriate timing is described below.

As described above, each user is required to perform a login operation when the user uses the image processing apparatus. If the user performs a logout operation that includes pressing a specific button or a hard key, the input processing unit 305 notifies the control processing unit 301 of the logout. Then, the control processing unit 301 instructs the paper feeding stage processing unit 302 and the paper brand processing unit 303 to delete the provisional paper. The paper brand processing unit 303 searches the paper brand DB 400 and deletes the entire information stored in a line if the numerical value stored in the category 408 field of this line is "3." The paper feeding stage processing unit 302 searches the paper feeding stage setting DB 500 and deletes the entire information stored in a line if the numerical value stored in the category 408 field of this line is "3." When the above-mentioned deletion processing has been completed, the paper feeding stage for which a provisional paper has been registered is brought into a non-registration state (i.e., a state where no paper type is set for the paper feeding stage) in the paper feeding stage setting DB 500. The non-registration state can be cancelled when a user who next uses the image processing apparatus performs a paper feeding stage paper setting operation accurately.

An open-and-close sensor (i.e., a sensor configured to detect an opening or closing state of the paper feeding stage) and a paper presence sensor (i.e., a sensor configured to detect the presence of a paper in the paper feeding stage) are incorporated in the paper feeding stage of the printer device 250 of the image processing apparatus. The control processing unit 301 receives sensing information from these sensors. The control processing unit 301 can determine that no provisional paper remains in the paper feeding stage based on the signals obtained from the open-and-close sensor and the paper presence sensor, when the papers have been entirely removed in a state where the paper feeding stage is opened and the paper feeding stage is closed in a paper absent state. Then, as mentioned above, the control processing unit 301 instructs the paper feeding stage processing unit 302 and the paper brand processing unit 303 to delete provisional paper information.

Thus, it is feasible to delete the registered provisional paper information when the provisional papers are completely removed from the paper feeding stage.

It can be presumed that the provisional paper is temporarily used when the image processing apparatus processes a job. Accordingly, it is useful that the image processing apparatus has a function of deleting the registration of the provisional paper at timing when a (copy or print) job has been completed. If the control processing unit 301 detects completion of a job that uses a provisional paper that has been registered beforehand, the control processing unit 301 instructs the paper feeding stage processing unit 302 and the paper brand processing unit 303 to delete provisional paper information as mentioned above. Further, if the control processing unit 301 receives a job using the same provisional paper within a predetermined time, the control processing unit 301 processes the received job without performing the above-mentioned deletion processing. In this case, deletion of the provisional paper information can be instructed when the predetermined time has elapsed after the completion of the job.

<Restricting the Usage of a Provisional Paper Based on User Authentication>

As described in the above-mentioned exemplary embodiment, a user performs a login operation when the user uses the image processing apparatus and gives a unique name including a part or the whole of the user name to a provisional paper. In response to the login operation, the control processing unit 301 stores identification information (e.g., user name or user ID) about the login user in the memory unit 306. In this case, the user name or the user ID is an example of user information. When a provisional paper is generated, the control processing unit 301 transmits a notification including information about user name or user ID to the paper brand processing unit 303. FIG. 21 illustrates a paper brand DB 450 that is usable in such a case. The paper brand DB 450 includes attributes of ID 452 to category 458, which are similar to the above-mentioned attributes ID 402 to category 408. The paper brand DB 450 further includes an attribute owner 459 newly added. The attribute "owner" 459 is an example of attribute information about the provisional paper. The paper brand processing unit 303 stores the user information (i.e., user name or user ID) notified from the control processing unit 301 in the owner 459 field. The "provisional paper 1" illustrated in FIG. 21 is a provisional paper generated when the login user is a user B. Therefore, user ID "BBBBB" of the user B is stored in the owner 459 field in line 475 of the paper brand DB 450. Similarly, the "user-defined paper 1" is a user-defined paper generated when the login user is a user A. Therefore, user ID "AAAAA" of the user A is stored in the owner 459 field in line 474 of the paper brand DB 450. Further, the numerical value "0" is stored in the owner 459 field in each of lines 471, 472, and 473, because the basic papers are initially prepared and can be used freely.

FIG. 22 illustrates another paper feeding stage setting DB 550. The paper feeding stage setting DB 550 is different from the above-mentioned paper feeding stage setting DB 500 in that an owner 559 field is added. When a paper type is set for a paper feeding stage, the paper feeding stage processing unit 302 copies a corresponding paper type from the paper brand DB 450 and pastes the copied information in the owner 559 field, as mentioned above. As understood from line 571 of FIG. 22, the "provisional paper 1" is set for the paper feeding stage 1 and the user ID "BBBBB" is stored in the owner 559 field.

Next, an example of job processing using the provisional paper is described in detail below. When the job to be performed by the image processing apparatus is a copy job, a user performs a login operation to use the image processing apparatus as mentioned above. The control processing unit 301 stores user ID of the login user in the memory unit 306 and acquires the owner 559 value from the paper feeding stage setting DB 550, which corresponds to a paper feeding stage to be used for the copy job, from the paper feeding stage processing unit 302. If the user ID coincides with the owner 559 value, the control processing unit 301 determines that a user who currently uses the provisional paper for the copy job is the user who has generated the provisional paper. Therefore, the control processing unit 301 continues to process the copy job.

When the job to be performed by the image processing apparatus is a print job, a print driver embeds user ID of the user having logged in the PC in the job. When the control processing unit 301 receives the print job, the control processing unit 301 extracts user ID information from the job, and stores the extracted ID information in the memory unit 306. The control processing unit 301 acquires the owner 559 value from the paper feeding stage setting DB 550, which corresponds to a paper feeding stage to be used for the print job, from the paper feeding stage processing unit 302, and compares the acquired value with the user ID. If the compared values coincide with each other, the control processing unit 301 continues to process the print job.

As mentioned above, only a user who has generated a provisional paper is allowed to use the provisional paper.

Further, the present embodiment can be realized by performing the following processing. More specifically, the processing includes supplying a software program that can realize the functions of the above-mentioned exemplary embodiments to a system or an apparatus via a network or an appropriate storage medium and causing a computer (or a CPU or a micro-processing unit (MPU)) of the system or the apparatus to read the program and execute processing according to the program.

According to each of the above-mentioned exemplary embodiments, a general user can easily set a provisionally used paper for a paper feeding stage.

Additional embodiments can also be realized by a computer of a system or apparatus that reads out and executes computer executable instructions recorded on a storage medium (e.g., computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that these embodiments are not seen to be limiting. The scope of the following claims is to be accorded the broadest interpretation so as to encompass all such modifications and equivalent structures and functions.

This application claims the benefit of Japanese Patent Application No. 2012-268380, filed Dec. 7, 2012, which is hereby incorporated by reference herein in its entirety.

What is claimed is:

1. A printing apparatus comprising:
   a paper holding unit;
   a storage unit configured to store paper information including name information indicating a paper name and attribute information indicating paper attributes;
   a display unit configured to display a setting screen for setting the paper information for the paper holding unit;
   a determination unit configured to determine whether an instruction input via the setting screen is a first instruction to set the paper information, which is selected by a user from among a plurality of pieces of paper information stored in the storage unit for the paper holding unit or a second instruction to generate new paper information and set the generated new paper information for the paper holding unit;
   a generating unit configured to generate the new paper information including name information and attribute information if the determination unit determines that the second instruction has been input;
   a setting unit configured to set the paper information, which is selected by the user from among the plurality of pieces of paper information stored in the storage unit, for the paper holding unit if the determination unit determines that the first instruction has been input, and configured to set the new paper information generated by the generating unit for the paper holding unit if the determination unit determines that the second instruction has been input ;and
   a deletion unit configured to delete the new paper information generated by the generating unit if execution of a job using a paper indicated by the new paper information has been completed.

2. The printing apparatus according to claim 1, wherein the generating unit is configured to, if the determination unit determines that the second instruction has been input, generate the new paper information based on specific paper information of the plurality of pieces of paper information stored in the storage unit.

3. The printing apparatus according to claim 2, wherein the generating unit is configured to, if the determination unit determines that the second instruction has been input, copy attribute information of the specific paper information and set the copied attribute information as attribute information to be included in the new paper information.

4. The printing apparatus according to claim 3, wherein the generating unit is configured to, if the determination unit determines that the second instruction has been input, generate new name information and set the newly generated name information as name information to be included in the new paper information.

5. The printing apparatus according to claim 4, wherein the generating unit is configured to generate the new name information based on a user name of a user who is currently logging in the printing apparatus.

6. The printing apparatus according to claim 2, wherein the specific paper information is paper information selected from the plurality of pieces of paper information stored in the storage unit.

7. The printing apparatus according to claim 2, wherein the specific paper information is paper information indicating a plain paper.

8. The printing apparatus according to claim 1, wherein the paper attributes at least include grammage.

9. A method for controlling a printing apparatus that includes a paper holding unit and a storage unit configured to store paper information including name information indicating a paper name and attribute information indicating paper attributes, the method comprising:

displaying a setting screen for setting paper information for the paper holding unit;

determining whether an instruction input via the setting screen is a first instruction to set paper information, which is selected by a user from among a plurality of pieces of the paper information stored in the storage unit for the paper holding unit or a second instruction to generate new paper information and set the generated new paper information for the paper holding unit;

generating the new paper information including name information and attribute information if it is determined that the second instruction has been input;

setting the paper information, which is selected by the user from among the plurality of pieces of paper information stored in the storage unit, for the paper holding unit if it is determined that the first instruction has been input, and setting the new paper information generating for the paper holding unit if it is determined that the second instruction has been input; and deleting the generated new paper information if execution of a job using a paper indicated by the new paper information has been completed.

10. A non-transitory computer-readable storage medium storing computer executable instructions that cause a computer to execute the method for controlling the printing apparatus according to claim 9.

* * * * *